US006169549B1

United States Patent
Burr

(10) Patent No.: US 6,169,549 B1
(45) Date of Patent: Jan. 2, 2001

(54) METHOD AND APPARATUS FOR PROVIDING CONTINUOUS LEVEL OF DETAIL

(75) Inventor: Timothy J. Burr, San Jose, CA (US)

(73) Assignee: iEngineer.com, Inc., Sunnyvale, CA (US)

(*) Notice: Under 35 U.S.C. 154(b), the term of this patent shall be extended for 0 days.

(21) Appl. No.: 09/003,863

(22) Filed: Jan. 7, 1998

(51) Int. Cl.[7] ........................................ G06F 15/00
(52) U.S. Cl. .......................................... 345/419
(58) Field of Search ................... 345/440, 441, 345/433, 428, 118, 121, 419, 421, 427

(56) References Cited

U.S. PATENT DOCUMENTS

| | | | |
|---|---|---|---|
| 5,659,691 | 8/1997 | Durward et al. ............... | 395/329 |
| 5,675,721 | 10/1997 | Freedman et al. ............. | 395/129 |
| 5,917,494 | * 4/2000 | Arai et al. ....................... | 345/419 |
| 6,049,625 | * 4/2000 | Sakamoto ........................ | 345/419 |

OTHER PUBLICATIONS

Li, J. et al; "Progressive compression of 3D graphic models," Proc. IEEE Intl Conference on Multimedia Computing and Systems, Apr. 1997.

Deering, M; "Geometry Compression," Computer Graphics Proc., Los Angeles CA, Aug. 1995, pp. 13–20.

Evans, F. et al.; "Optimizing Triangle Strips for fast Rendering," Proc. of the Visualization Conference, San Francisco, CA, Oct. 1996, pp. 319–326.

Popovic, J. et al.; "Progressive Simplicial Complexes," Computer Graphics Proc., Siggraph 97, Los Angeles, CA, Aug. 1997, pp. 217–224.

Taubin, G., et al.; "Geometric Compression through Topological Surgery," Research Report RC–20340 (#89924), Jan. 16, 1996, pp. 1–32; http://www.research.ibm.com/vrml/binary/pdfs/ibm20340r1.pdf.

Arikawa, M. et al., "Dynamic LoD for QoS Management in the Next Generation VRML," *Proceedings of the Intl. Conf. on Multimedia Computing and Systems*, Jun. 17, 1996.

Hoppe, H., Progressive Meshes, Computer Graphics Proceedings, Annual Conference Series, 1996, pp. 99–108.

Funkhouser, T.A. and Sequin, C.H., "Adaptive Display Algorithm for Interactive Frame Rates during Visualization of Complex Virtual Environments," Computer Graphics Proceedings, Annual Conf. Series 1993, pp. 247–254.

* cited by examiner

*Primary Examiner*—Phu K. Nguyen
(74) *Attorney, Agent, or Firm*—Pillsbury Madison & Sutro, LLP

(57) ABSTRACT

A method and apparatus that provides for off-line generation of, and run-time evaluation for, continuous LODs. The off-line multiresolution generation process is modified and constrained such that a progressive mesh representation for continuous LODs is created that allows properly designed run-time topological data structures to be overloaded to support both LOD construction and optimized rendering. More specifically, the offline generation process initially preprocesses the mesh to generate a triangle-fan covering composed of only complete cycles. The multiresolution generation process is then constrained to maintain this complete cycle covering for every interim mesh. For run-time evaluation, a topological adjacency representation is used that can serve dual uses. This supportive run-time representation is partitioned so as to allow efficient access by the renderer to the subset of the adjacency information that is the fan covering. The multiresolution representation can be generated so as to allow discontinuities to be rendered at some cost to rendering performance.

37 Claims, 18 Drawing Sheets

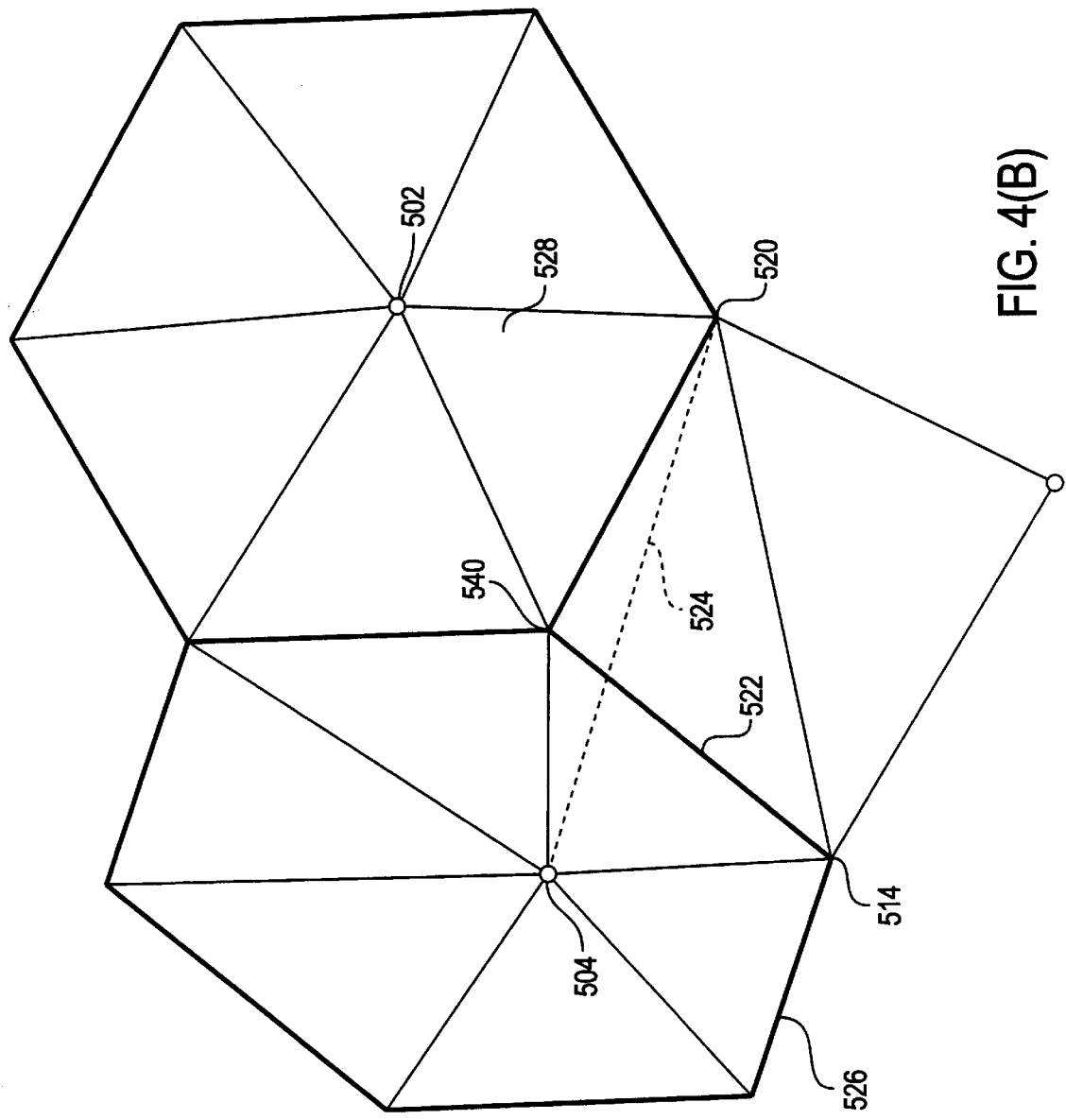

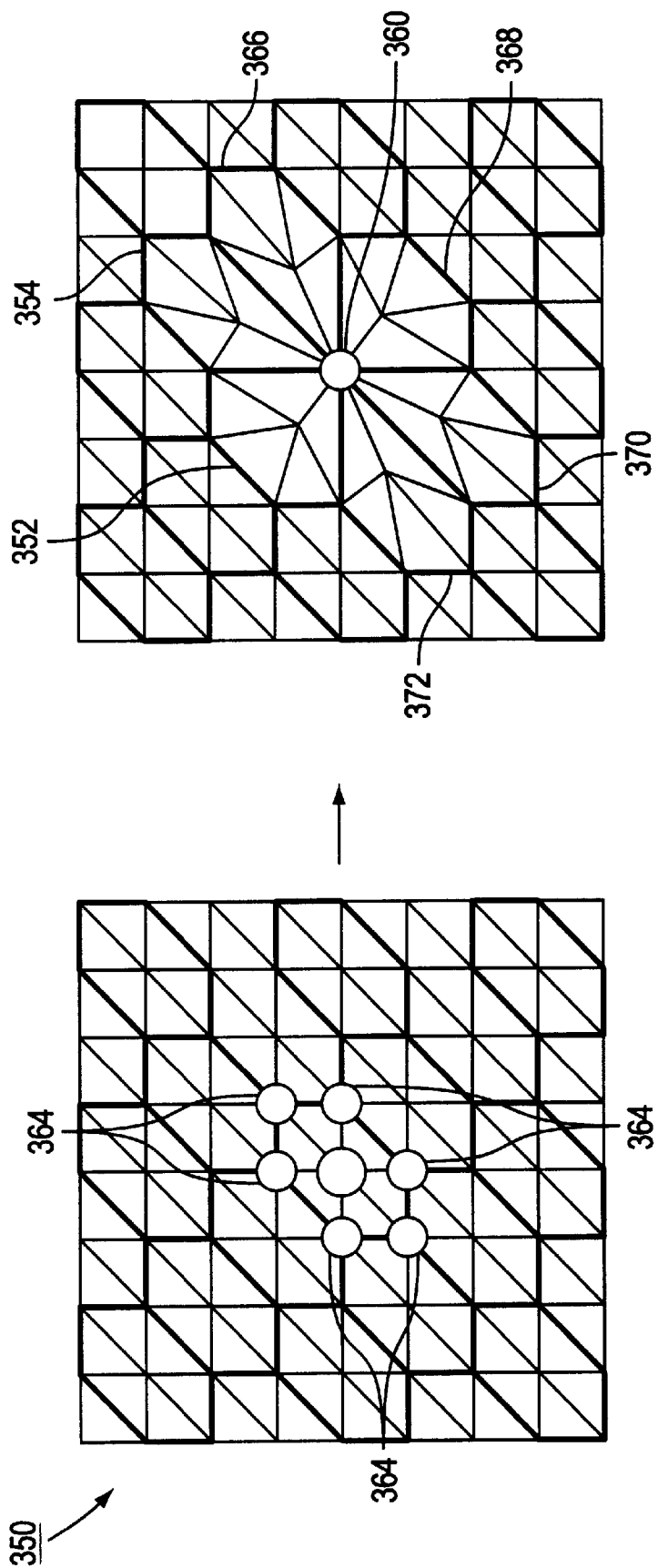

METHOD AND APPARATUS FOR PROVIDING CONTINUOUS LEVEL OF DETAIL

BACKGROUND OF THE INVENTION

1. Field of the Invention

The present invention relates to computer graphics, and more particularly, to a constrained progressive mesh representation coupled with a supporting, run-time, dual-use topological adjacency data structures that enables real-time, scalable continuous level of detail (LOD).

2. Description of the Related Art

In computer graphics, objects are typically modeled offline by a modeling process, then transmitted from a server to a client to be rendered during run-time. During offline processing, conventional modeling systems produce tesselated polygonal approximations or meshes. These polygons may be even further converted to triangles by triangulation. During run-time, it is desirable to render the object by transforming the mesh into a visual display using several levels of detail (LOD). For example, when the object is close to the viewer, a detailed mesh is used. As the object recedes from the viewer, coarser approximations are substituted. Storing representations of modeled objects requires memory space, transmitting them from servers to clients requires bandwidth, and rendering them quickly and efficiently requires processor horsepower, all of which issues are directly or indirectly tied to the amount of data required at each step.

Statically-generated, coarse-grained, discrete LODs have been widely used in real-time graphics for many years because they are relatively simple to generate and then utilize at run-time. The use of discrete LODs, however, has undesirable effects on visual and frame-rate continuity. For example, when transitioning between different discrete LODs, the observer perceives an instantaneous switching or "popping." Continuous LODs do not cause these problems because they allow fine-grained modifications in geometric representations of objects, and thus scenes, on a per-frame basis. This increased detail elision resolution allows the renderer to minimize variance in frame-rate and visual fidelity.

In a paper entitled "Progressive Meshes," published in *Computer Graphics* (*SIGGRAPH '96 Proceedings*), (1996), pp. 99–108, Hugues Hoppe describes a scheme for providing continuous LODs wherein a mesh simplification procedure is used to reduce a complex, highly detailed mesh M into a coarse approximation $M^0$ (base mesh), along with a sequence of n detail records that indicate how to incrementally refine the base mesh $M^0$ exactly back into the original mesh $M=M^n$. Hoppe introduced a simplification transformation called the "edge collapse," and its inverse refinement transformation called the "vertex split." In addition to storing the base mesh $M^0$ and the n detail records, topological adjacency and attribute (e.g., normals) information is stored for performing these transformations. With this information, a LOD builder process can perform changes to the base mesh to obtain any desired incremental level of detail between the base mesh and the original mesh.

While Hoppe's continuous LODs offer a solution to the problem of mesh representation, a robust and scalable implementation of his scheme has its challenges. First, to construct LODs dynamically on a per-frame basis, topological adjacency information must be available to the LOD builder. This information comes at a significant memory cost that is incurred on a per-object basis. Either this cost must be reduced or the benefits reaped therefrom must be increased. As will be described in more detail below, the present invention achieves the latter by, inter alia, utilizing the adjacency information to optimize rendering speed.

Second, since an object's topological connectivity (i.e., its mesh) is changing dynamically, it is difficult to maintain a partitioning of the mesh that can be used to optimize rendering. There are two mesh partitionings that are widely supported by graphics APIs (e.g. OpenGL, Direct3D): triangle strip and triangle fan (or cycle) partitionings. High-quality strip and fan partitionings must be generated offline because they are too computationally expensive to be generated in real-time. Therefore, in real-time, as the mesh changes dynamically, high-quality partitionings are difficult to achieve.

One possible solution to this problem is to compute the partitioning for the base mesh offline and then apply incremental updates at run-time. However, this results in poor quality partitionings for higher resolution LODs, as the generation of high quality partitionings is a global, not local, optimization problem. A better solution, as offered by the present invention and described in more detail below, is to generate a multiresolution mesh that preserves the partitioning at all resolutions.

Mesh discontinuities present further challenges. A discontinuity is a crease, corner or other manifestation of non-smoothness on the surface of a mesh. More formally, a discontinuity exists at the boundary of two surface primitives when the inner product of the tangent vectors is not zero—i.e., the derivatives are not collinear. Discontinuity representation is an essential component of realistic rendering. Unfortunately, discontinuities have their cost both in space, time and programming complexity.

Currently, however, there is no data representation that allows for efficient processing, storing and rendering of discontinuities for continuous LODs. Rendering a mesh as a collection of independent triangles provides for maximum flexibility in rendering discontinuities but is inefficient in both time and space. Vertex pools, in current implementations in such graphics APIs as OpenGL, are only useful for rendering smooth objects because the normal indices cannot be specified separately from the coordinate indices. Accordingly, only per-vertex normals bindings can be used, whereas per-vertex, per-face binding is needed with independent triangles. Per-vertex, per-face (i.e. per-corner) bindings are possible, but vertices have to be duplicated, and this makes the implementation of continuous LODs very difficult.

Therefore, there remains a need for an implementation for providing continuous LODs that effectively manages the aforementioned space and time challenges while also allowing the rendering of mesh discontinuities. The present invention fulfills this need.

SUMMARY OF THE INVENTION

Accordingly, an object of the present invention is to provide continuous LODs without incurring unnecessary and wasteful storage requirements.

Another object of the present invention is to provide a method and apparatus for providing continuous LODs that effectively manages mesh partitionings to optimize rendering.

Another object of the present invention is to provide a method and apparatus for providing continuous LODs that allows rendering of mesh discontinuities.

The present invention describes the offline generation of, and run-time evaluation process for, continuous LODs that accomplishes these objectives, among others. In a preferred form, the invention modifies and constrains the offline multiresolution generation process such that a representation for continuous LODs is created that allows properly designed run-time topological data structures to be overloaded, thus supporting both LOD construction and optimized rendering. More specifically, the offline generation process initially preprocesses the mesh to generate a covering composed of only complete triangle cycles. The multiresolution generation process is then constrained to maintain this complete cycle covering for every interim mesh. For run-time evaluation, a topological adjacency representation is used that can serve the dual use described above. The multiresolution representation can be generated so as to allow discontinuities to be rendered at some cost to rendering performance.

Accordingly, the present invention enables the rendering of continuous LODs using a triangle-cycle or triangle-fan covering. This method differs from conventional techniques in at least two respects. The first is that the triangle cycles in this method are of higher quality than the triangle strips used in conventional techniques. The second is that the cost of maintaining the partitioning at run-time is much lower in the present invention. Continuous LODs require adjacency information at run-time to quickly modify the mesh. This technique overloads the adjacency information to serve the dual use of representing the triangle cycle partitioning as well as its intrinsic role of supplying the necessary topological adjacency information to the mesh modification process.

BRIEF DESCRIPTION OF THE DRAWINGS

These and other objects and advantages of the present invention will become apparent to those skilled in the art after considering the following detailed specification, together with the accompanying drawings wherein:

FIGS. 4(A) through 4(D) illustrate an example of a diagonal swap operation performed when pre-processing a mesh according to the invention;

FIGS. 6(A) through 6(D) illustrate an example of a CBV-CV collapse in a cycle-preserving PM decimation according to the invention;

DETAILED DESCRIPTION OF THE PREFERRED EMBODIMENTS

Figure 1:
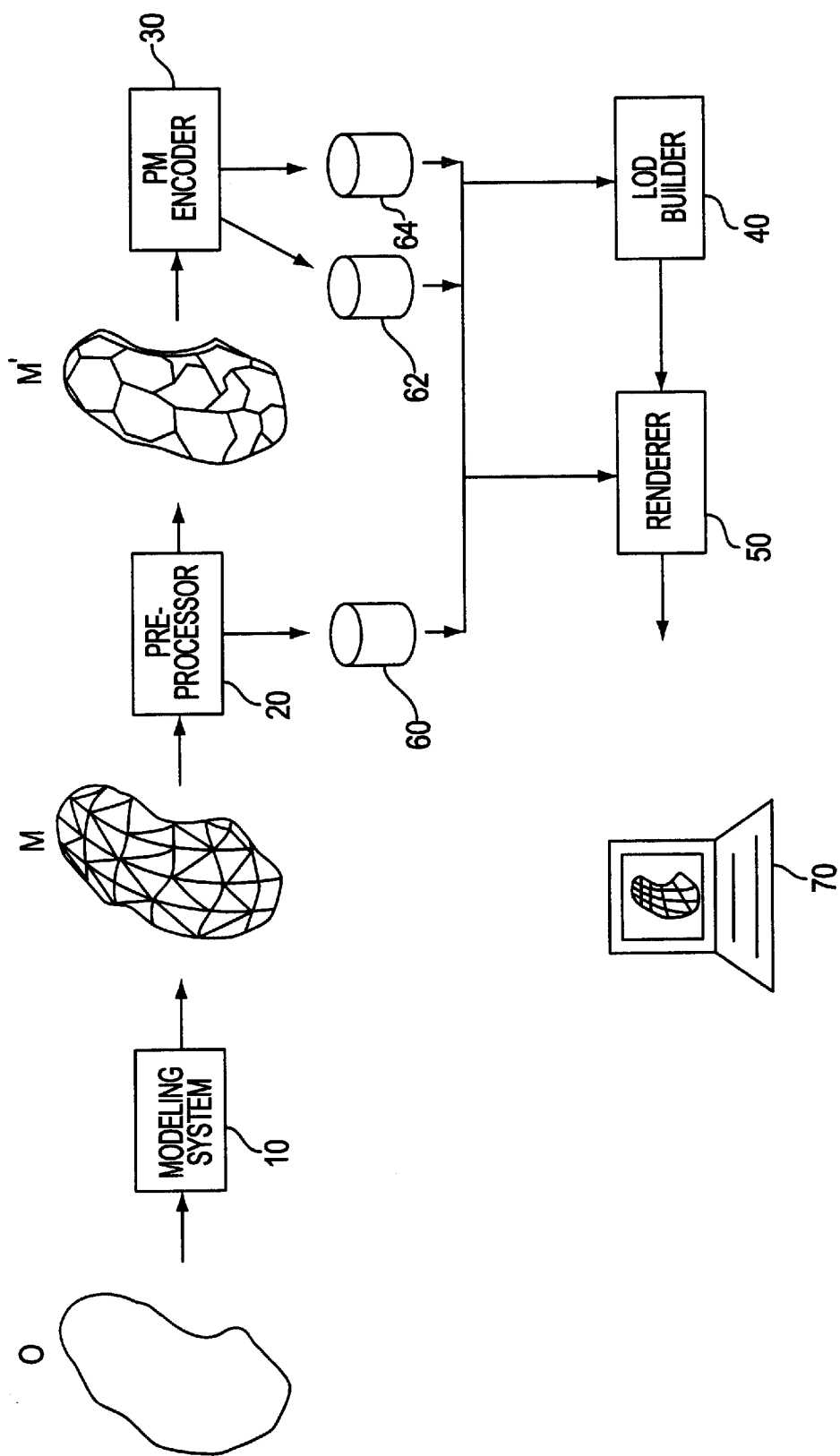
FIG. 1 illustrates the processing that provides continuous level of detail in a computer graphics system according to the present invention.

FIG. 1 illustrates a computer graphics system for providing continuous LODs according to the present invention. It includes a modeling system 10, a pre-processor 20, a PM encoder 30, a LOD builder 40, and a renderer 50. Modeling system 10 can be any known system that produces a tesselated mesh M representing a model of object O. The mesh is pre-processed by pre-processor 20, thus producing a complete-cycle covering M' of mesh M, along with a diagonal swap list 60. The pre-processed mesh is then encoded by PM encoder 30 to generate a cycle-preserving base mesh 62, along with a sequence of interim meshes, each having an associated level of detail as determined by PM modification records 64. LOD builder 40 builds a mesh having a desired level of detail provided by base mesh 62 and PM modification records 64, and the mesh is rendered on a graphics display 70 by renderer 50. Diagonal swap information 60 is used to eliminate any error introduced by pre-processor 20, if desired.

Typically, the modeling, pre-processing and PM encoding operations are performed during offline processing, and the LOD construction and rendering operations are performed during run-time evaluation.

It should be apparent to those skilled in the art of computer graphics that the above processing elements can be embodied by any combination of hardware and software components. The actual combination chosen is thus incidental to the invention.

Figure 2:
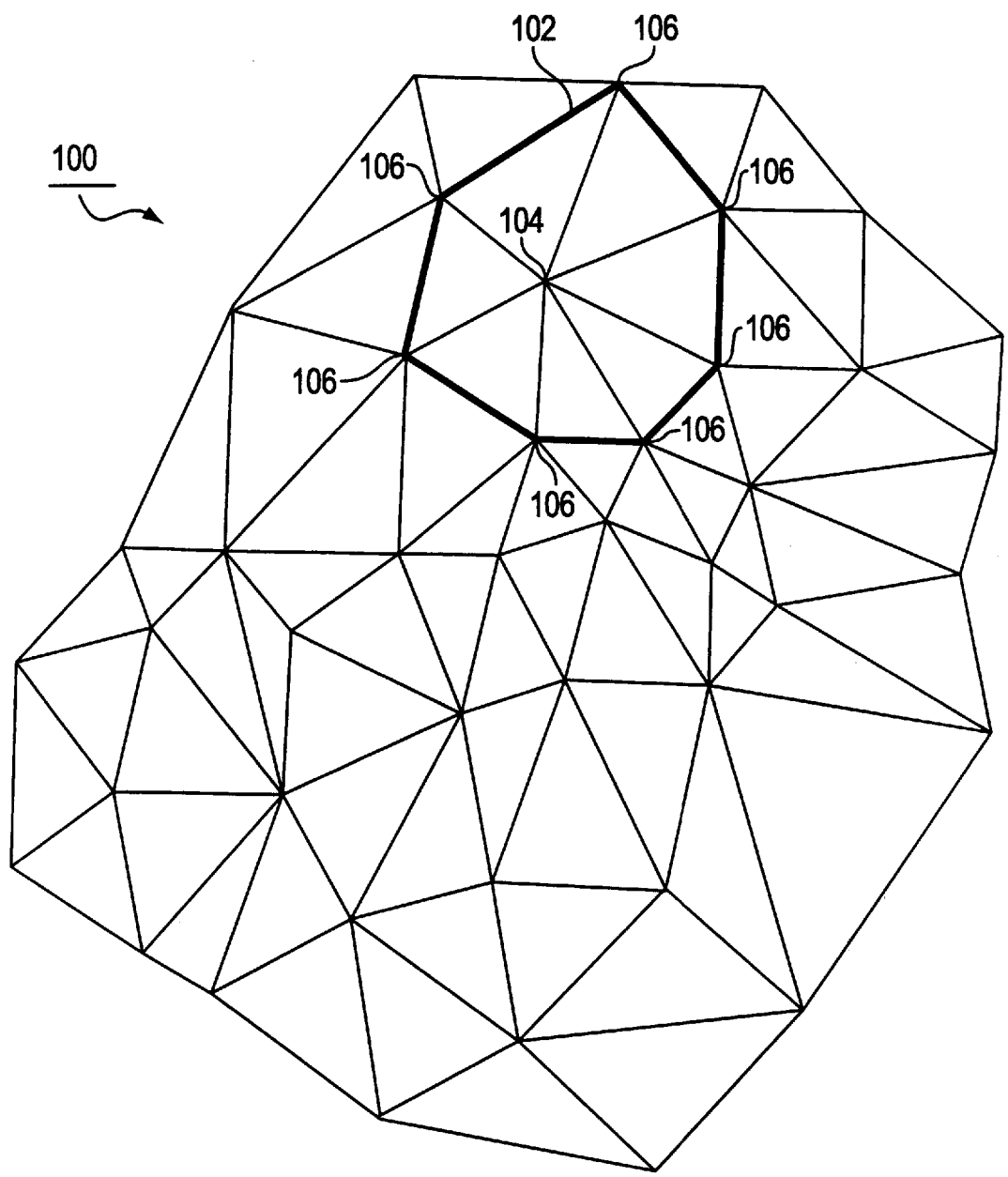
FIG. 2 is an example of a triangle cycle or fan in a mesh according to the invention.

An example of a mesh 100 used to represent a modeled object is shown in FIG. 2. In this example, and in the following detailed descriptions, a triangle mesh is used, but the invention is not limited to this example only; rather, the invention is applicable to other n-sided meshes as well.

Mesh 100 includes a triangle cycle or fan 102, a cycle vertex 104, and cycle-boundary vertices 106. As will be explained in more detail below, mesh 100 is pre-processed so that it is completely covered by non-overlapping triangle cycles such as cycle 102.

As can be seen in FIG. 2, cycle vertex (CV) 104 is a vertex which has its boundary vertices in cycle 102. That is, all vertices adjacent to CV 104 are located on the boundary of cycle 102. Moreover, all the adjacent vertices form a cycle around CV 104, the valence of the cycle being seven (i.e., seven adjacent vertices) in this example. The adjacent vertices 106 are cycle-boundary vertices (CBVS) in that they do not have a cycle in a covering, and are located in the cycle boundary of CV 104. In other words, each CBV 106 is a non-covering vertex.

Pre-Processing

As will now be explained in more detail, mesh 100 is pre-processed to generate a representation that can be used for continuous LODs. This involves generating a list of triangle cycles or fans, each composed of a complete cycle of CBVs around a CV. Where a mesh can not be covered only by complete cycles, diagonal swap operations are performed, and the lost information is stored for subsequent lossless reproduction.

A mesh that has a covering of complete cycles adheres to the following axioms:

1. A CV does not have a CV of another cycle as one of its CBVs. If this were allowed, then the CV cycles would overlap and the covering would not consist of complete cycles only. The following corollaries derive from this axiom:
   A. Each CV has only CBVs in its cycle boundary.
   B. A minimal closed loop of CBVs must surround a single CV.
2. Each CBV has a cycle boundary that consists of one or more occurrences of a CV-CBV sequence.

A. Proof
   i. Adjacent vertices in a CBV's cycle cannot be CVs as this would violate the first axiom (i.e., it would require that a CV has another CV as one of its CBVs).
   ii. Assume that vertices in a CBVs cycle boundary are all CBVs. Given that the mesh over which the covering is being computed is triangulated, then there will exist one or more faces in the cycle formed by three CBVs. A face is a closed loop. However, this closed loop does not surround any CV, which violates corollary B of the first axiom.
B. Axiom corollaries
   A CBV must have an even valence, i.e., a cycle boundary about a CBV must consist of an even number of vertices.
3. A CV may have even or odd valence, i.e., a cycle boundary about a CV may consist of an even or odd number of vertices.
   A. Proof
      i. A triangulated hexongonal tiling is a covering where each CV has even valence.
      ii. A CBV-CBV edge collapse yields a minimally complete triangle covering where two cycle vertices have odd valence.

Figure 3B:
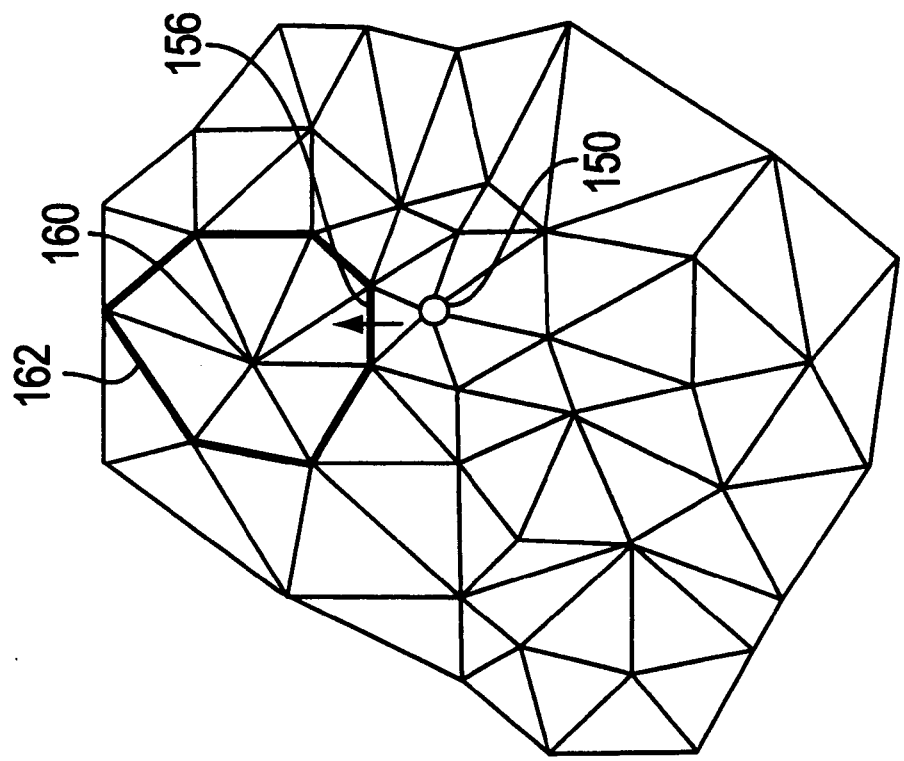
FIGS. 3(A) through 3(AF) illustrate an example of pre-processing a mesh to have a complete-cycle covering in accordance with the present invention.
Figure 3A:
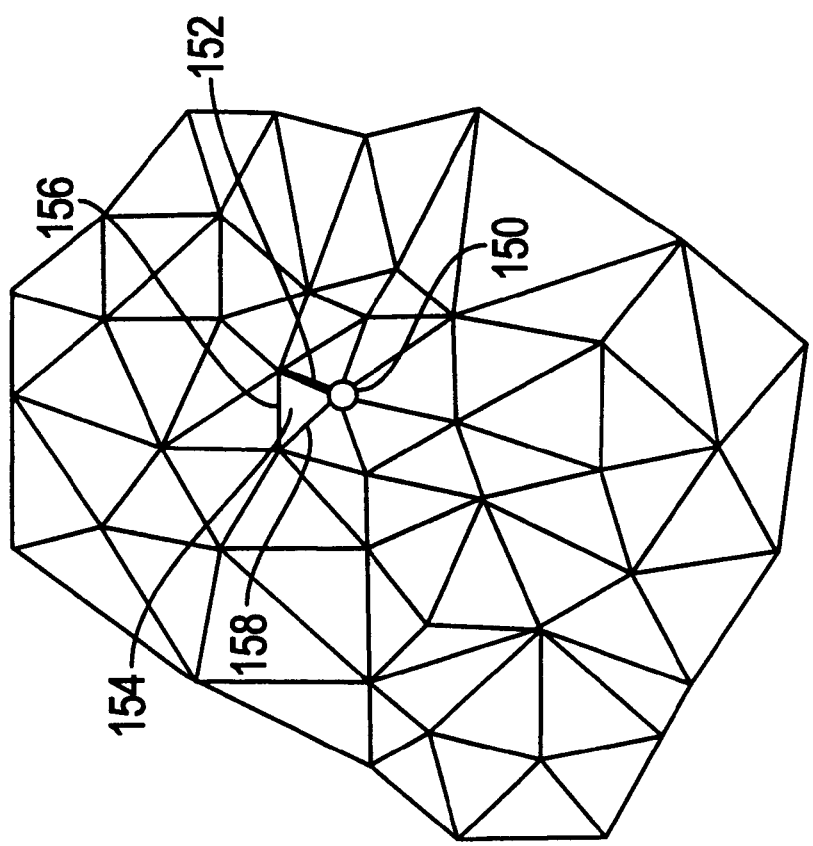
Figure 3C:
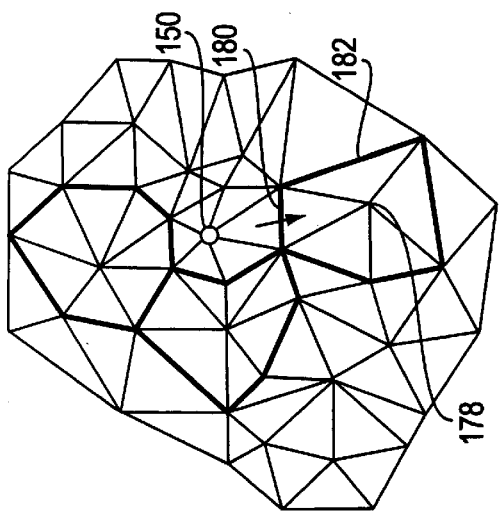
Figure 3F:
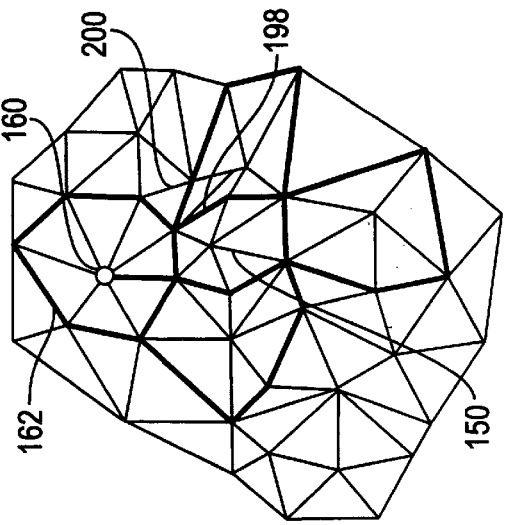
Figure 3D:
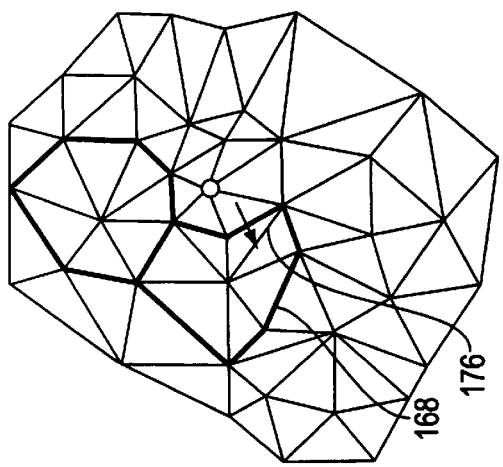
Figure 3G:
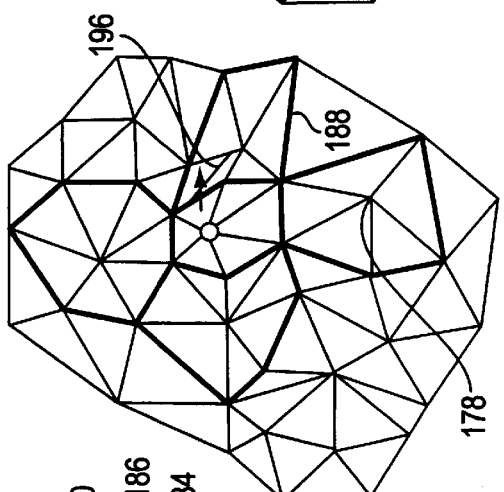
Figure 3E:
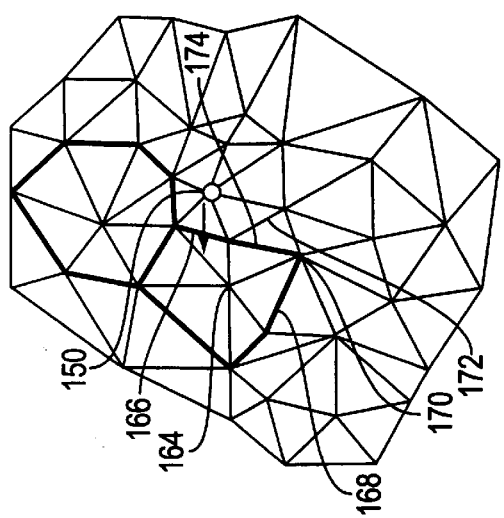
Figure 3H:
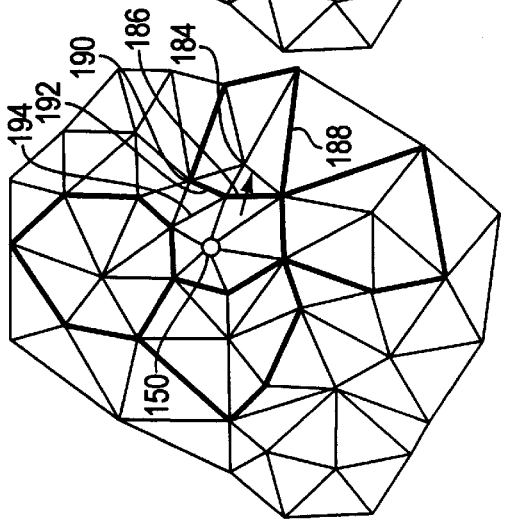
Figure 3J:
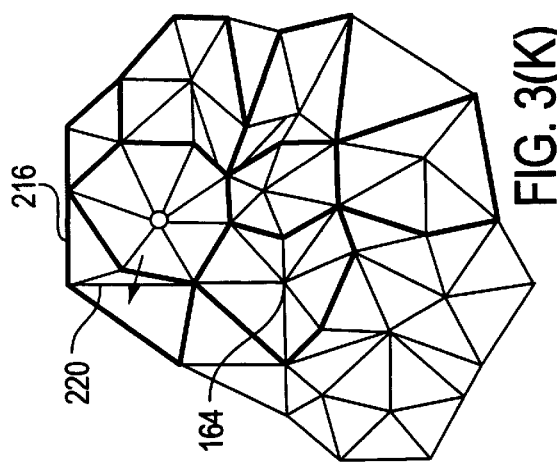
Figure 3N:
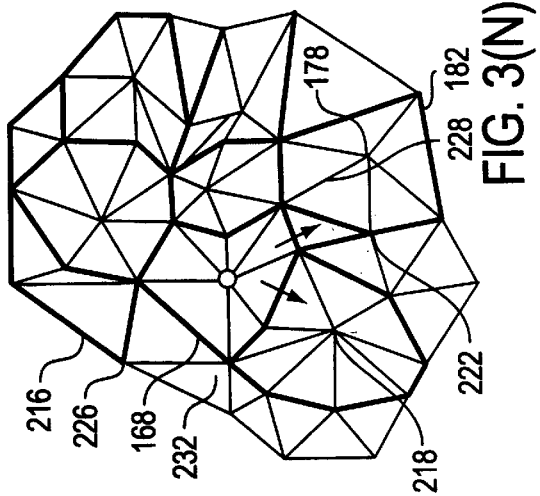
Figure 3J:
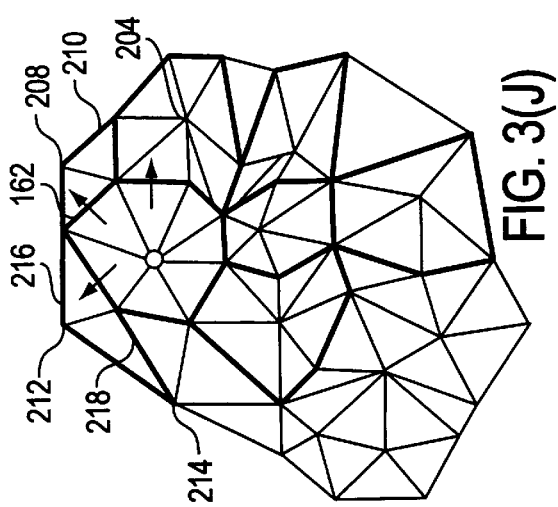
Figure 3M:
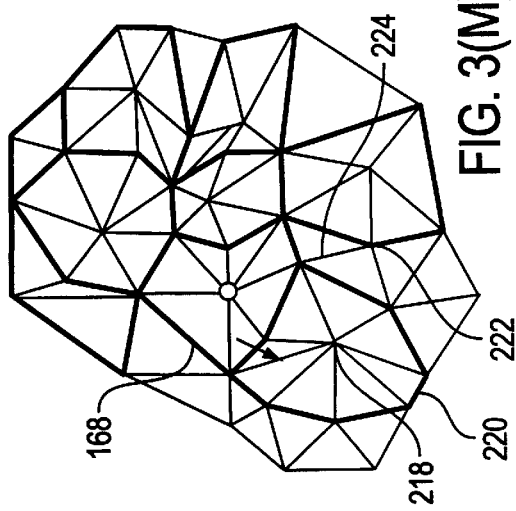
Figure 3I:
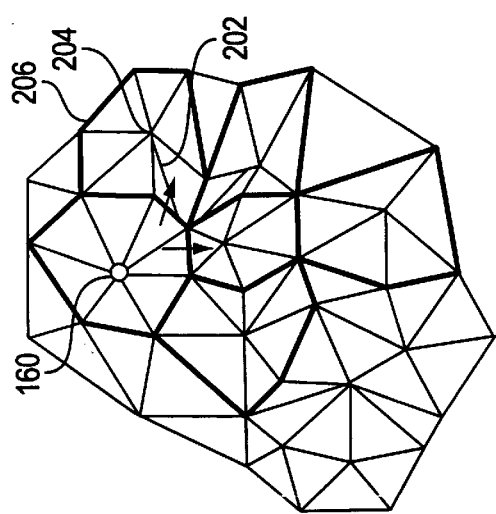
Figure 3L:
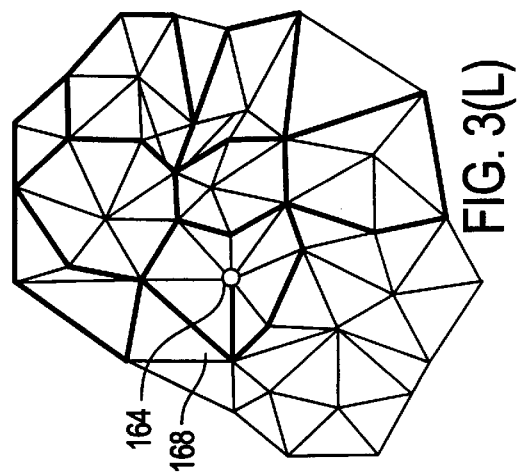
Figure 3P:
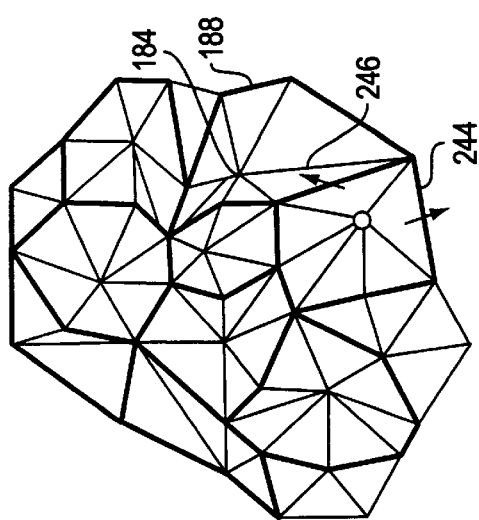
Figure 3Q:
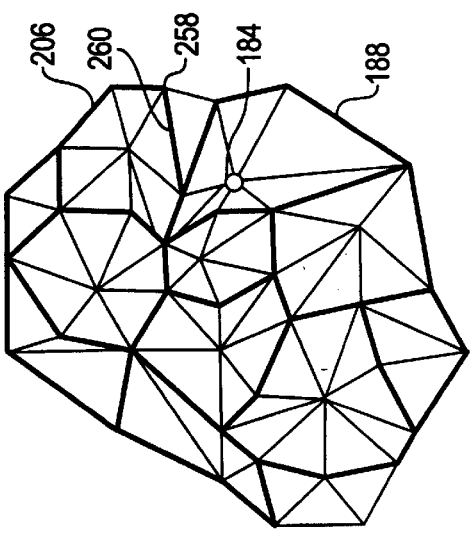
Figure 3S:
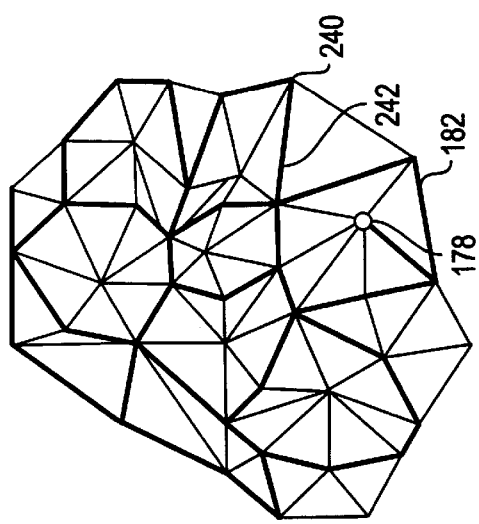
Figure 3T:
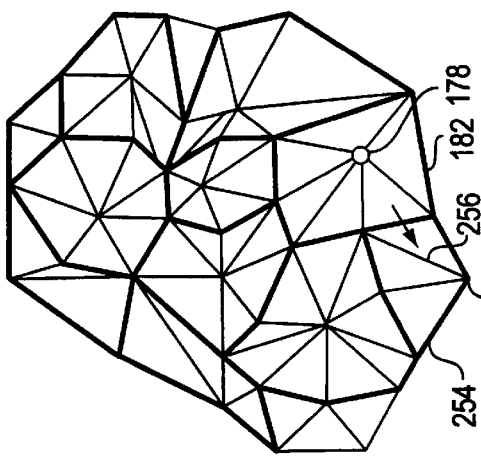
Figure 3O:
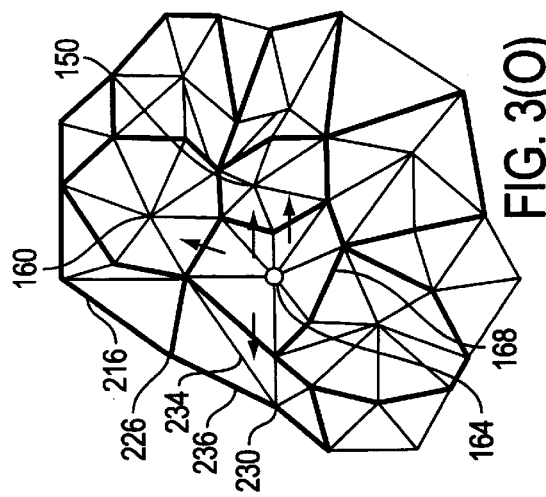
Figure 3R:
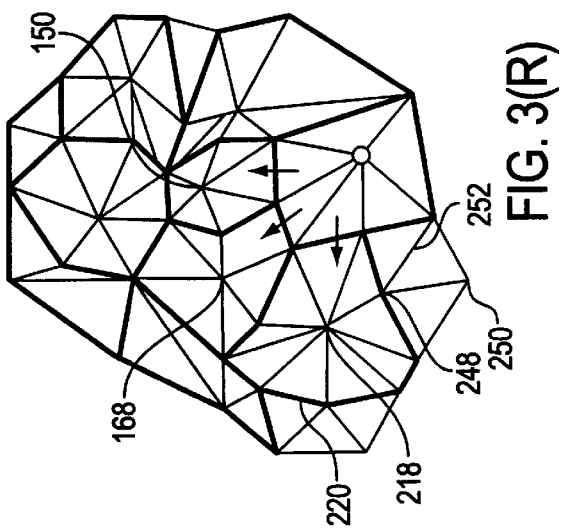
Figure 3W:
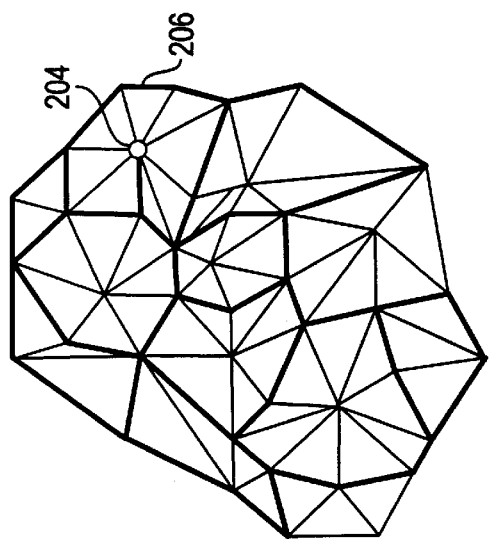
Figure 3Z:
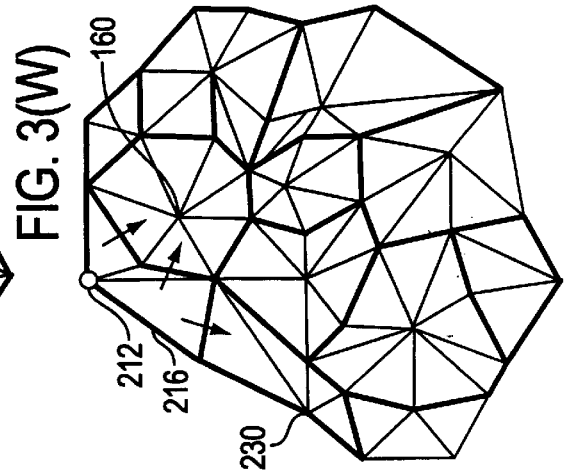
Figure 3V:
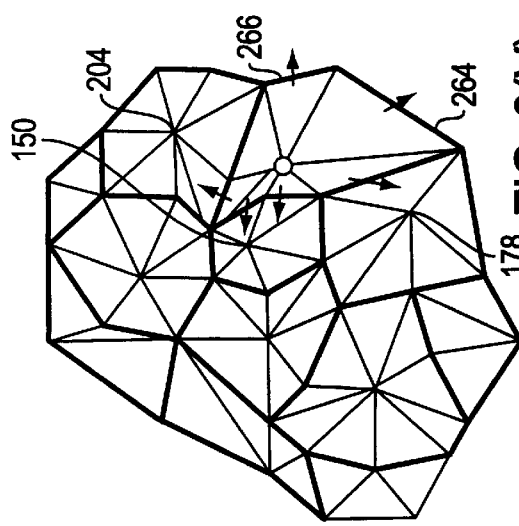
Figure 3Y:
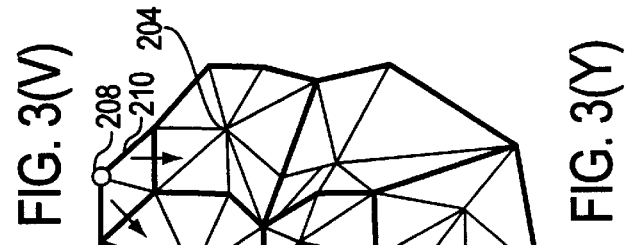
Figure 3U:
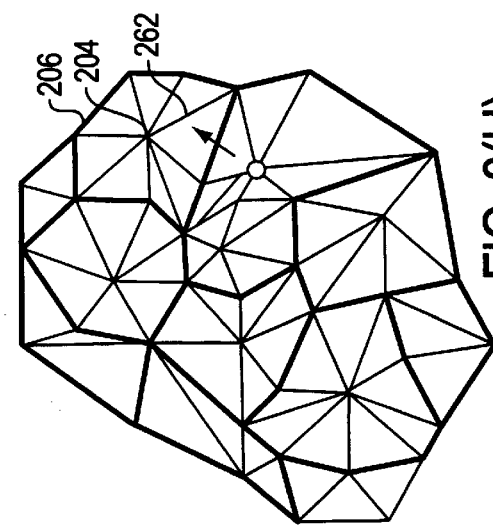
Figure 3X:
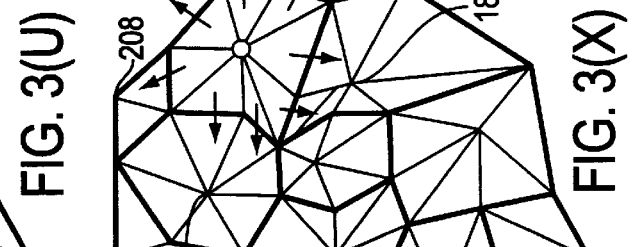
Figure 3:
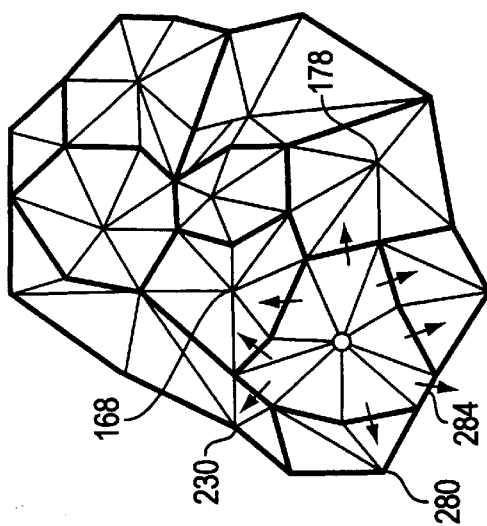
Figure 3:
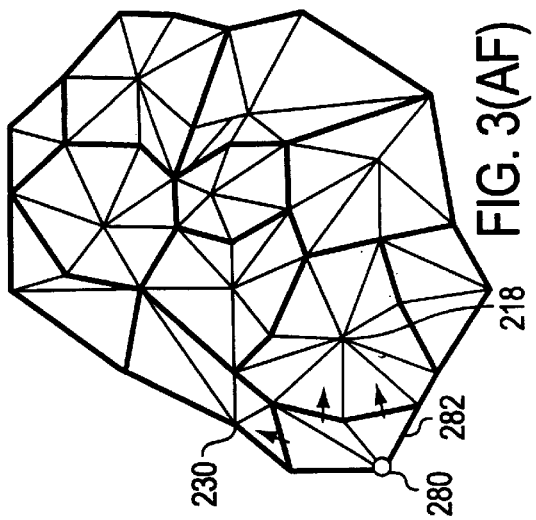
Figure 3:
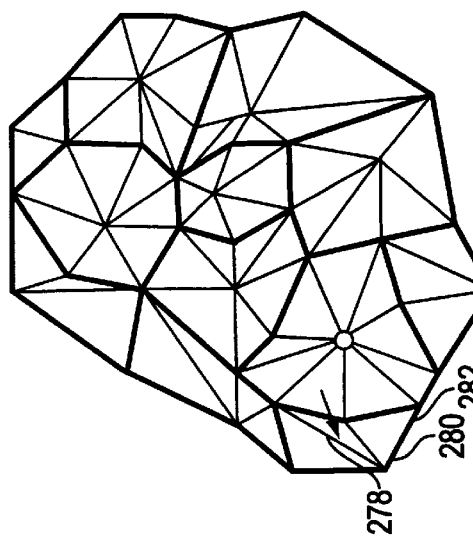
Figure 3:
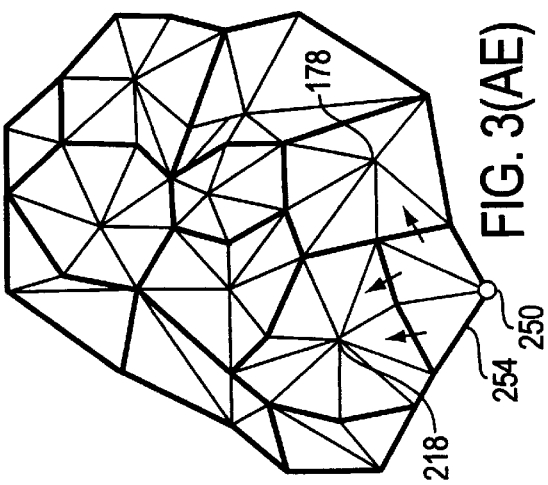
Figure 3:
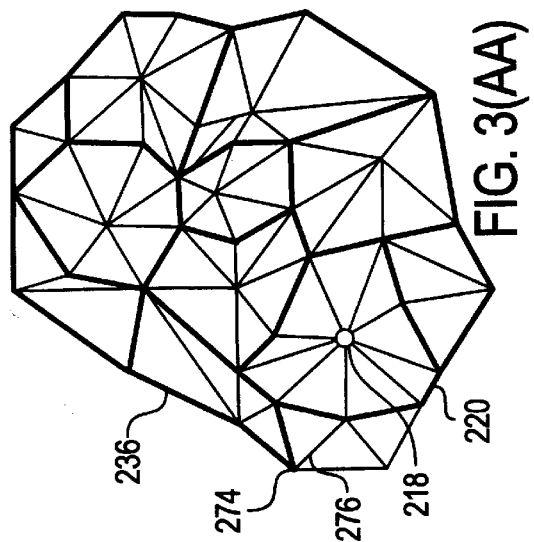
Figure 3:
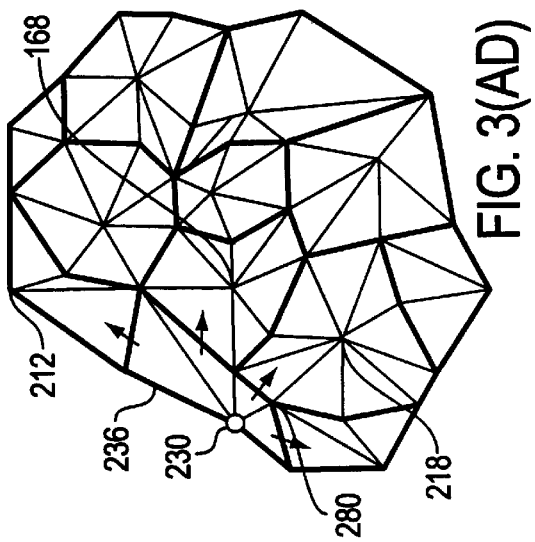

FIGS. 3(A) through 3(AF) illustrate an example of pre-processing a mesh with complete-cycle coverings in accordance with the present invention.

Pre-processing is performed by evaluating all vertices about potential cycle vertices. Unevaluated mesh 100 in FIG. 3(A) initially has no cycle coverings and all vertices are unidentified. The object of pre-processing is to identify all vertices in the mesh as either cycle vertices or cycle boundary vertices, the identification being performed so that the mesh forms a complete-cycle covering that satisfy all the axioms.

Accordingly, pre-processing begins by choosing a seed vertex from all vertices in the mesh. As will be described in more detail below, for each triangle about the seed vertex, starting from a starting edge and rotating counter-clockwise, the opposite vertex across the edge opposite from the seed vertex is analyzed to determine whether it, as a potential cycle vertex, satisfies all the axioms described above. If not, a diagonal swap operation is performed. After all opposite vertices across all triangles about the seed vertex have been analyzed, pre-processing continues by setting the cycle vertex opposite the first triangle as the active vertex and by analyzing all opposite vertices from triangles about the active vertex. Pre-processing continues until all vertices in the mesh have been analyzed and have been identified as either a CV or a CBV. At that point, the mesh is completely covered in complete cycles. Pre-processing will be described in more detail with the illustrative example given below.

In FIG. 3(A) the seed vertex 150 and cycle start edge 152 are identified. A first cycle triangle or face 154, bordered by the closed loop consisting of cycle start edge 152, first boundary edge 156 and cycle end edge 158, is identified.

In FIG. 3(B), first opposite vertex 160, which is opposite seed vertex 150 from first boundary edge 156, is identified. First opposite vertex 160 is set as the active cycle vertex and first cycle 162 is formed around vertex 160. First cycle 162 is a complete cycle that satisfies all the axioms, so pre-processing continues to the next cycle triangle in a counter-clockwise direction around seed vertex 150.

In FIG. 3(C), second opposite vertex 164, which is opposite seed vertex 150 from second boundary edge 166, is identified. Second opposite vertex 164 is set as the active cycle vertex and second cycle 168 is formed around vertex 164. Second cycle 168 is a complete cycle that satisfies all axioms, so pre-processing continues to the next cycle triangle in a counter-clockwise direction around seed vertex 150.

In the next step, second cycle boundary vertex 170 is encountered as a potential CV because it is opposite seed vertex 150 from third boundary edge 172. However, vertex 170 can not be a CV because it is already identified as a CBV of cycle 168, thus violating the first axiom that a CV can not have a CV of another cycle as one of its CBVs.

Accordingly, in FIG. 3(D), a diagonal swap operation is performed. In this operation, second cycle boundary edge 174 is identified, deleted and replaced by first diagonal 176. Second cycle 168 is a complete cycle that satisfies all axioms and vertex 170 is no longer a potential CV. The diagonal swap information is stored to make possible later lossless reconstruction of mesh 100.

A diagonal swap operation as described above will now be explained in more detail with reference to FIGS. 4(A) through 4(D).

In this example, all the opposite vertices from triangles about active CV 502 are being evaluated. Other vertices and cycles of the mesh being pre-processed are not shown in this figure for clarity. Previously, vertex 504 has been identified as a CV, with vertices 506, 508, 510, 512, 514, and 516 all being identified as CBVs. Vertex 518 is not yet identified. When pre-processing continues in a counter-clockwise fashion about CV, vertex 514 is encountered as the next opposite vertex. Having already been identified as a CBV, it can not be a CV, so an edge swap operation is performed.

First, all the quadrilaterals that overlap the triangle having vertices 514, 516 and 520 are identified. In this case, there are three, the first quadrilateral defined by vertices 504, 514, 520, and 516, the second quadrilateral defined by vertices 502, 520, 514, and 516, and the third quadrilateral defined by vertices 518, 514, 516, and 520.

Next, the diagonal swap for each quadrilateral is examined and determined whether it will result in a legal operation, that is, whether the resulting covering will satisfy all axioms as a result of the diagonal swap.

In FIG. 4(B), the swap of diagonal 522 with diagonal 524 in the first quadrilateral is examined. This is a legal operation, because it will cause the valence of cycle 526 to increase by one due to the addition of vertex 520 as a CBV of cycle 526. Moreover, CV 504 of cycle 526 now becomes the opposite vertex across triangle 528 of active CV 502, rather than vertex 514 which remains a CBV of cycle 526.

Figure 4A:
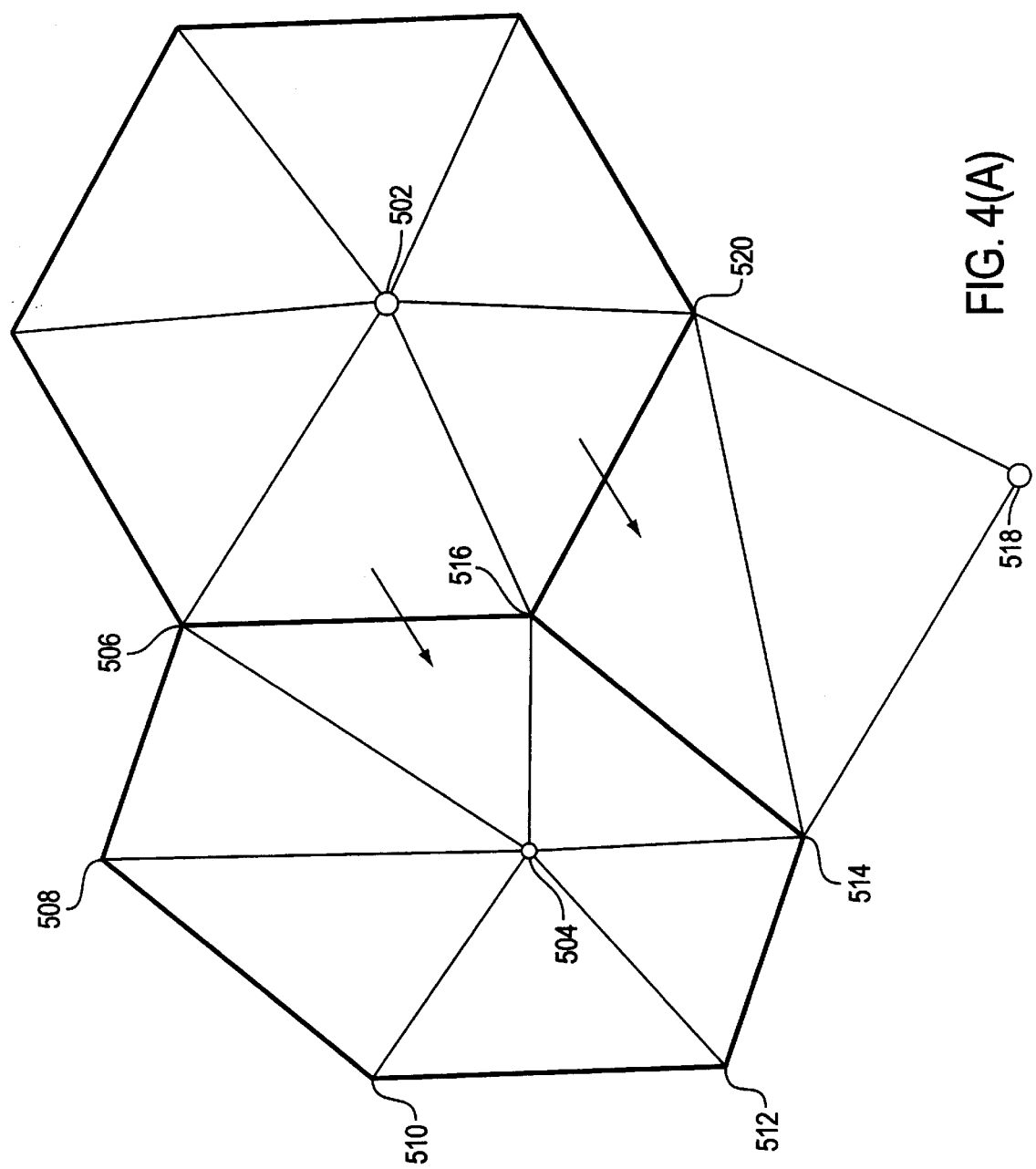
Figure 4C:
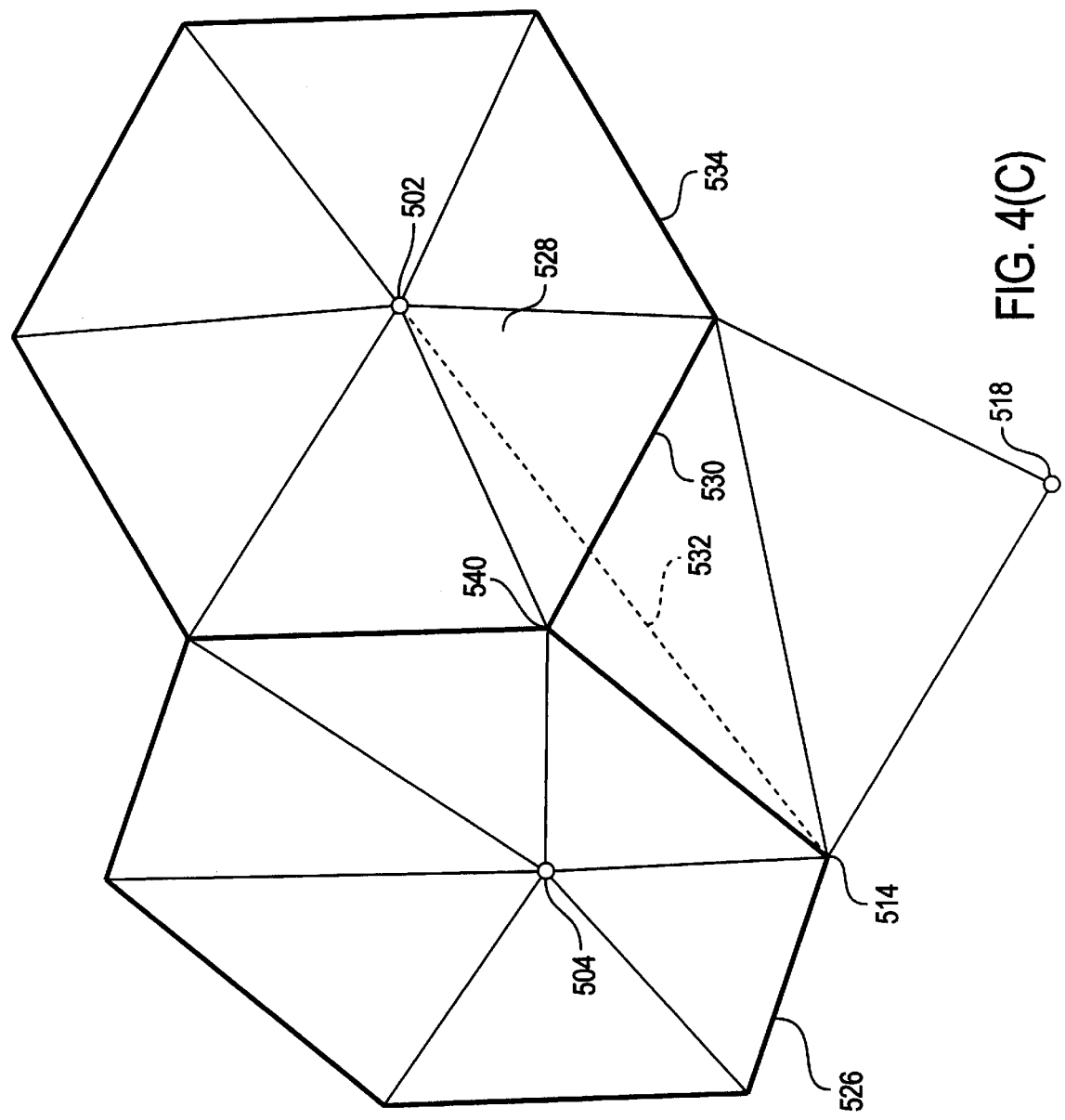

In FIG. 4(C), the swap of diagonal 530 with diagonal 532 in the second quadrilateral is examined. This is a legal operation, because it will cause the valence of cycle 534 to increase by one due to the addition of vertex 514 as a CBV of cycle 534. Moreover, triangle 528 of active CV 502 is split into two, with CV 504 becoming the opposite vertex across the first half of triangle 528, and vertex 518 becoming the opposite vertex across the second half of triangle 528, neither of these vertices being CBVs. Vertex 514 remains a CBV of cycle 526 and also becomes a CBV of cycle 534.

Figure 4D:
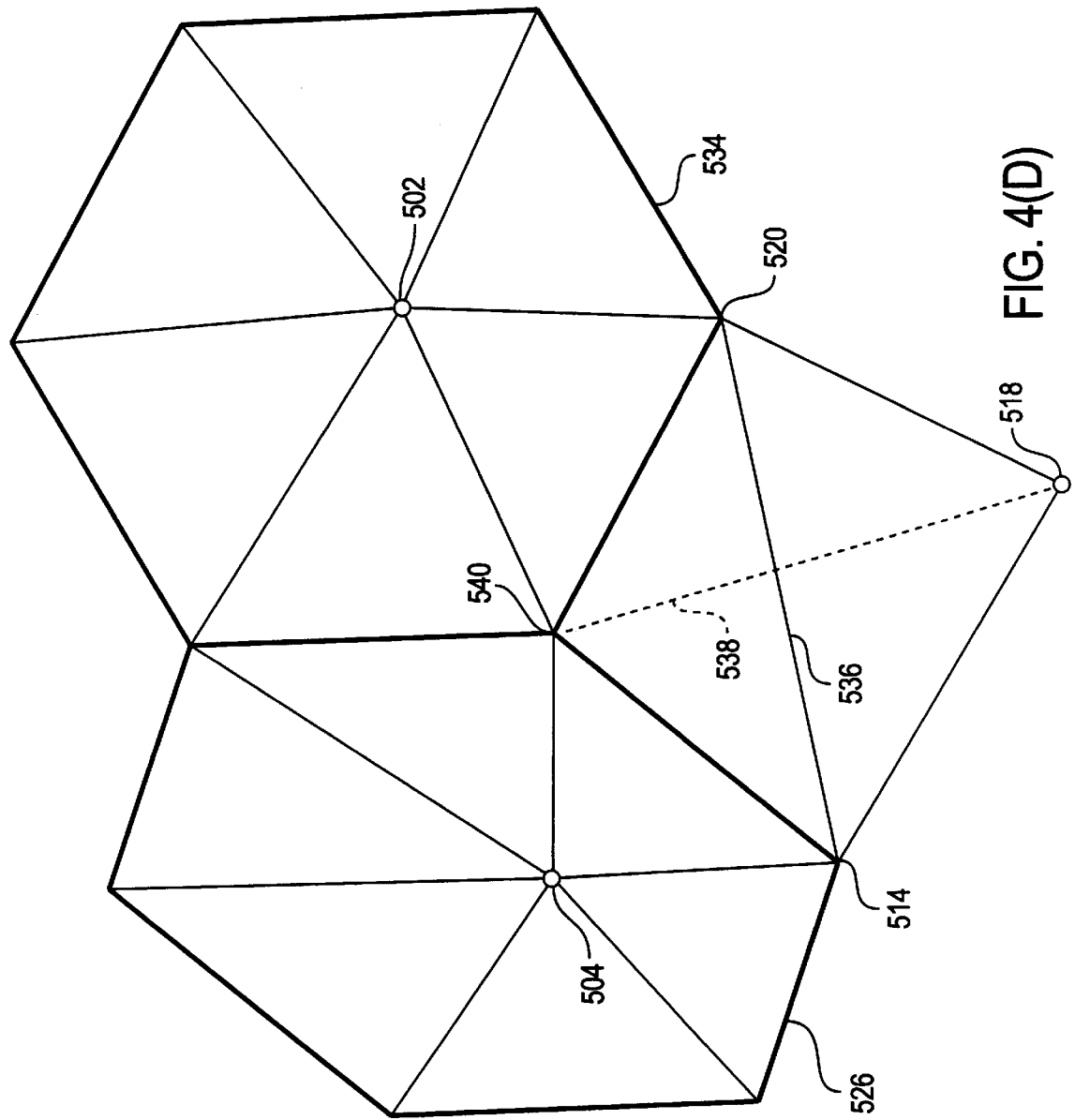

In FIG. 4(D), the swap of diagonal 536 with diagonal 538 in the third quadrilateral is examined. This is a legal operation only if vertex is unidentified or is already a CV, because of the axiom that no adjacent vertices in a cycle about a CBV can be the same. Specifically, since vertices 514 and 520 are already identified as CBVs, vertex 518, which would now lie between vertices 514 and 520 in the cycle about CBV 540, must become a CV.

After all the potential diagonal swaps are identified, at least one potential diagonal swap will be legal. If more than one are legal, as in the illustration above, certain criteria can be applied to determine which to choose. Alternatively, of course, for simplicity the first legal diagonal swap identified can be used, or one of the legal diagonal swaps can be selected arbitrarily.

One criterion is to select the diagonal swap that most avoids skinny triangles. For example, the swap of diagonal 530 for diagonal 532 in FIG. 4(C) will result in a long skinny triangle having vertices 502, 540 and 514. To express it another way, the minimum interior angle of the triangle is less than the minimum angle of any other triangle created as a result of a diagonal swap.

When a diagonal swap from the potential diagonal swaps is selected, the old diagonal can be deleted by updating the cycle information. In other words, in the diagonal swap of FIG. 4(B), diagonal 522 is effectively deleted and replaced by diagonal 524 by updating the vertex list for cycle 526 about 504, which now includes vertex 520 between CBVs 514 and 540. Alternatively, if a separate edge list is maintained, for example, the edges about vertex 504 can be updated.

Continuing on with the pre-processing of mesh 100, in FIG. 3(E), third opposite vertex 178, which is opposite seed vertex 150 from third boundary edge 180, is identified. Third opposite vertex 178 is set as the active cycle vertex and third cycle 182 is formed around vertex 178. Third cycle 182 is a complete cycle that satisfies all the axioms, so pre-processing continues.

In FIG. 3(F), fourth opposite vertex 184, which is opposite seed vertex 150 from fourth boundary edge 186, is identified. Fourth opposite vertex 184 is set as the active cycle vertex and fourth cycle 188 is formed around vertex 184. Fourth cycle 188 is a complete cycle that satisfies all axioms.

As pre-processing continues, vertex 190 is encountered. In particular, fourth cycle boundary vertex 190 is considered a potential CV because it is opposite seed vertex 150 from fifth boundary edge 194. However, vertex 190, having been already identified as a CBV of cycle 188, can not be a CV.

Accordingly, in FIG. 3(G), a diagonal swap operation is performed. In this operation, fourth cycle boundary edge 192 is identified, deleted and replaced by second diagonal 196. Fourth cycle 188 is now a complete cycle that satisfies all axioms. The diagonal swap information is stored to make possible later lossless reconstruction of mesh 100.

In FIG. 3(H), it is determined that there are no more potential CVs around seed vertex 150. Moreover, seed cycle 198 around seed vertex 150 is complete and, by default, completely legal. Pre-processing of mesh 100 continues by setting first opposite vertex 160 as the active vertex and by analyzing all the potential CVs around first cycle 162 in a counter-clockwise fashion.

In FIG. 3(I), seed vertex 150, being the first opposite vertex from vertex 160, is examined, and it is verified that cycle 198 is complete and satisfies all axioms. The next potential CV is vertex 202. However, it can not be a CV because it is already a CBV of fourth cycle 188. Accordingly, a diagonal swap operation must be performed. Illegal diagonal 200 (FIG. 3(H)) is identified, deleted, and replaced with third diagonal 196. The diagonal swap information is stored to make possible later lossless reconstruction of mesh 100. Vertex 202 still can't be a CV, so pre-processing continues by examining the next possible CV, which is vertex 204. After determining that vertex 204 can be a CV, fifth cycle 206 is formed around vertex 204. Fifth cycle 206 is now a complete cycle that satisfies all axioms.

In FIG. 3(J), pre-processing continues by re-examining vertex 204 because it is opposite from first opposite vertex 160 across two edges. The next potential CV is vertex 208. Although sixth cycle 210 formed around vertex 208 has a valence of only three, it is a valid cycle because vertex 208 is on the boundary of mesh 100. Moreover, sixth cycle 210 satisfies all axioms. The next potential CV is vertex 212. Although seventh cycle 216 formed around vertex 212 has a valence of only three, it is a valid cycle because vertex 212 is on the boundary of mesh 100. However, one CBV of seventh cycle 216, vertex 214, is a potential CV opposite from first cycle 162.

Accordingly, in FIG. 3(K), a diagonal swap operation is performed. In this operation, illegal edge 218 is identified, deleted and replaced by fourth diagonal 220. Seventh cycle 216 is a valid cycle that satisfies all axioms, and vertex 214 is no longer a potential CV. The diagonal swap information is stored to make possible later lossless reconstruction of mesh 100.

The last potential CV about cycle 162 is second opposite vertex 164. Its cycle is examined and found to be completely legal, so pre-processing continues in FIG. 3(L) by setting second opposite vertex 164 as the active vertex and by analyzing all the potential CVs around second cycle 168 in a counter-clockwise fashion.

In FIG. 3(M), the first potential CV about cycle 164 is vertex 218. Eighth cycle 220 is formed around vertex 218. Eighth cycle 220 is a complete cycle that satisfies all axioms, so pre-processing continues.

In FIG. 3(N), vertex 218 is examined again because it is opposite second opposite vertex 164 from two edges. Next, vertex 222 is examined and found to be illegal as a potential CV because it is already a CBV of third cycle 182. Accordingly, a diagonal swap operation is performed. In this operation, illegal edge 224 is identified, deleted and replaced by fifth diagonal 228. The diagonal swap information is stored to make possible later lossless reconstruction of mesh 100.

Third opposite vertex 178 is examined next as a potential CV about cycle 168. Third cycle 182, whose valence has now increased by one due to the diagonal swap operation, is now valid for all axioms.

In FIG. 3(O), pre-processing continues by examining vertices 150, 160 and 226 in turn as potential CVs. Seed vertex 150 is examined twice because it is opposite vertex 164 across two edges. The cycles about vertices 150 and 160 are completely legal, but vertex 226 is already a CBV of cycle 216. Accordingly, a diagonal swap operation is performed. In this operation, illegal edge 232 (see FIG. 3(N)) is identified, deleted and replaced by sixth diagonal 234. The diagonal swap information is stored to make possible later lossless reconstruction of mesh 100.

Vertex 230 is examined next as a potential CV about cycle 168. Being a valid potential CV, ninth cycle 236 is formed about vertex 230 and the cycle is found valid for all axioms. Accordingly, pre-processing about cycle 168 is completed.

In FIG. 3(P), pre-processing continues by setting third opposite vertex 178 as the active vertex and by analyzing all the potential CVs around third cycle 182 in a counter-clockwise fashion.

In FIG. 3(Q), it is found that there is no potential CV across mesh boundary edge 244, and the next potential CV is vertex 240 (see FIG. 3(P)). However, vertex 240 is already a CBV of fourth cycle 188. Accordingly, a diagonal swap operation is performed wherein illegal edge 242 (see FIG. 3(P)) is identified, deleted and replaced by seventh diagonal 246. The next potential CV is fourth opposite vertex 184 whose cycle 188, with an increased valence, is found valid for all axioms.

In FIG. 3(R), vertices 150, 168 and 218 are examined in turn as potential CVs. The cycles about each of these vertices are found valid. The next potential CV is vertex 248, which is already a CBV of eighth cycle 220. Accordingly, in FIG. 3(S), a diagonal swap operation is performed wherein illegal edge 252 (see FIG. 3(R)) is identified, deleted and replaced by eighth diagonal 256. The next potential CV is vertex 250, about which, being a valid CV, tenth cycle 254 is formed and found valid for all axioms.

Having identified and verified all potential CVs around cycle, 182, pre-processing continues by setting fourth opposite vertex 184 as the active vertex and by analyzing all the potential CVs around fourth cycle 188 in a counter-clockwise fashion.

In FIG. 3(T), the first potential CV identified is vertex 258. However, vertex 258 is already a CBV of fifth cycle 206. Accordingly, in FIG. 3(U), a diagonal swap operation is performed wherein illegal edge 260 (see FIG. 3(T)) is identified, deleted and replaced by ninth diagonal 262. The next potential CV is vertex 204, about which cycle 206, with an increased valence, is found valid for all axioms.

In FIG. 3(V), vertices 204 (for the second time), 150 (twice), and 178 are examined in turn as potential CVs. All cycles about them being completely legal, and mesh boundary edges 264 and 266 being identified, pre-processing continues in FIG. 3(W) by setting vertex 204 as the active vertex and by analyzing all the potential CVs around fifth cycle 206 in a counter-clockwise fashion.

In FIG. 3(X), vertices 208, 160 (twice), and 184 (twice) are examined in turn as potential CVs. All cycles about them are found completely legal, and mesh boundary edges 268, 270 and 272 are identified.

Pre-processing continues in FIG. 3(Y) by setting vertex 208 as the active vertex and by analyzing all the potential CVs around sixth cycle 210 in a counter-clockwise fashion. Vertices 204 and 160 are examined in turn as potential CVs. All cycles about them are found completely legal, and since vertex 208 is a mesh boundary vertex, no mesh boundary edges need be identified.

In FIG. 3(Z), pre-processing continues by setting vertex 212 as the active vertex and by analyzing all the potential CVs around seventh cycle 216 in a counter-clockwise fashion. Vertices 160 (twice) and 230 are examined in turn as potential CVs. All cycles about them are found completely legal, and since vertex 212 is a mesh boundary vertex, no mesh boundary edges need be identified.

Pre-processing continues in FIG. 3(AA) by setting vertex 218 as the active vertex and by analyzing all the potential CVs around eighth cycle 220 in a counter-clockwise fashion.

In FIG. 3(AB), vertex 274 is encountered as a potential CV, but it can not be one because it is already a CBV of ninth cycle 236. Accordingly, a diagonal swap operation is performed wherein illegal edge 276 (see FIG. 3(AA)) is identified, deleted and replaced by tenth diagonal 278. The next potential CV is vertex 280, about which eleventh cycle 282 is formed.

In FIG. 3(AC), vertices 280, 250 (twice), 178, 168 (twice), and 230 are examined in turn as potential CVs. All cycles about them are found completely legal, and mesh boundary 284 is identified.

Pre-processing continues in FIG. 3(AD) by setting vertex 230 as the active vertex and by analyzing all the potential CVs around ninth cycle 236 in a counter-clockwise fashion. Vertices 280, 218, 168 and 212 are examined in turn as potential CVs. All cycles about them are found completely legal, and since vertex 230 is a mesh boundary vertex, no mesh boundary edges need be identified.

In FIG. 3(AE), pre-processing continues by setting vertex 250 as the active vertex and by analyzing all the potential CVs around tenth cycle 254 in a counter-clockwise fashion. Vertices 178 and 218 (twice) are examined in turn as potential CVs. All cycles about them are found completely legal, and since vertex 250 is a mesh boundary vertex, no mesh boundary edges need be identified.

Finally, in FIG. 3(AF), the last cycle in the mesh is analyzed. Vertex 280 as the active vertex and all the potential CVs around eleventh cycle 282 in a counter-clockwise fashion. Thus, vertices 218 (twice) and 230 are examined in turn as potential CVs. All cycles about them are found completely legal, and since vertex 280 is a mesh boundary vertex, no mesh boundary edges need be identified.

Since mesh 100 is completely covered with cycles which have all been analyzed, and all diagonal swap information has been stored, pre-processing is complete.

The following table contains pseudocode that illustrates an implementation example of the method used to pre-process a mesh in accordance with the present invention.

TABLE 1

```
ComputeMinimallyCompleteTriangleCycleCovering(mesh, seedsv)
{
        /* Initialize all vertices to be undefined (!=cv & !=cbv) */
        /* Choose a seed cycle vertex to start growing the covering from */
                unevaluatedCVStack.push(seedsv)
        /* Grow the covering */
        While (!unevaluatedCVStack.empty())
        {
                active_cv = unevaluatedCVStack.pop();
                CreateCycleVerticesAbout(mesh,active_cv,
                        unevaluatedCVStack,
                        swappedDiagonalList);
        }
}
CreateCycleVerticesAbout(mesh, active_cv, unevaluatedCVStack,
                swappedDiagonalList)
{
        For (each triangle ti in active_cv's cycle)
        {
                oppv = vertex opposite ti;
                if (oppv is a CBV)
                {
                        ccwv = vertex ccw from active_cv in ti;
```

TABLE 1-continued

```
            cwv = vertex cw from active_cv in ti;
            oppti = triangle which shares edge [ccwv, cwv] with ti;
            For (each quadrilateral qi that overlaps oppti)
            {
                    swap diagonal of qi;
                    if (swap was legal)
                    {
                            minangle(qi) = minimum interior
                                angle of triangles of
                                altered qi;
                    }
            }
            If (more than one swap was legal)
            {
                    swappedqi = quad with the swap that
                        generated the max minangle;
                    swappedEdge = new diagonal of swappedqi;
                    swapped DiagonalList.push(swappedEdge);
                    mark appropriate vertex of swappedqi as a cv;
                    mark adjacent vertices of new cv as cbvs;
                    unevaluatedCVstack.push(new cv);
            }
            else
                    /* The only legal swap will be from the quad
                        formed by vertices [active_cv, ccwv, oppv,
                        cv] */
                    swappedEdge = [active_cv, oppv];
                    swappedDiagonalList.push(swappedEdge);
                    mark oppv as a cv;
                    mark adjacent vertices of oppv as cbvs;
                    unevaluatedCVStack.push(oppv);
            }
            else if (oppv is unidentified)
            {
                mark oppv as a cyclevertex;
                mark all adjacent vertices as cbv's;
                unevaluatedCVStack.push(oppv);
            }
        }
    }
}
```

Cycle-Preserving Progressive Mesh

The conventional progressive mesh method generates a multiresolution representation of a mesh that can be interpreted dynamically in an efficient manner to recover mesh level of detail with vertex-level granularity. The conventional method is lossless as the original mesh can be recovered completely. A progressive mesh (PM) is created using a sequence of edge collapse operations. There are no constraints on the order in which the edges are collapsed or on what edges can be collapsed in a conventional PM. The primary objective in choosing a sequence of edge collapses is to produce a sequence of interim meshes that maximizes some quality criterion—such as error to the original mesh.

In accordance with an aspect of the present invention, there is added the constraint that the complete cycle covering be preserved for each interim mesh. That is, the base mesh and each interim mesh is comprised only of complete cycles that satisfy all axioms. A PM with this property is referred to as a cycle-preserving PM.

A cycle-preserving PM has three decimation operations, as opposed to one for the conventional PM (edge collapse): CBV-CBV collapse, CBV-CV collapse, and CV-CBV collapse.

Figures 5A, 5B:
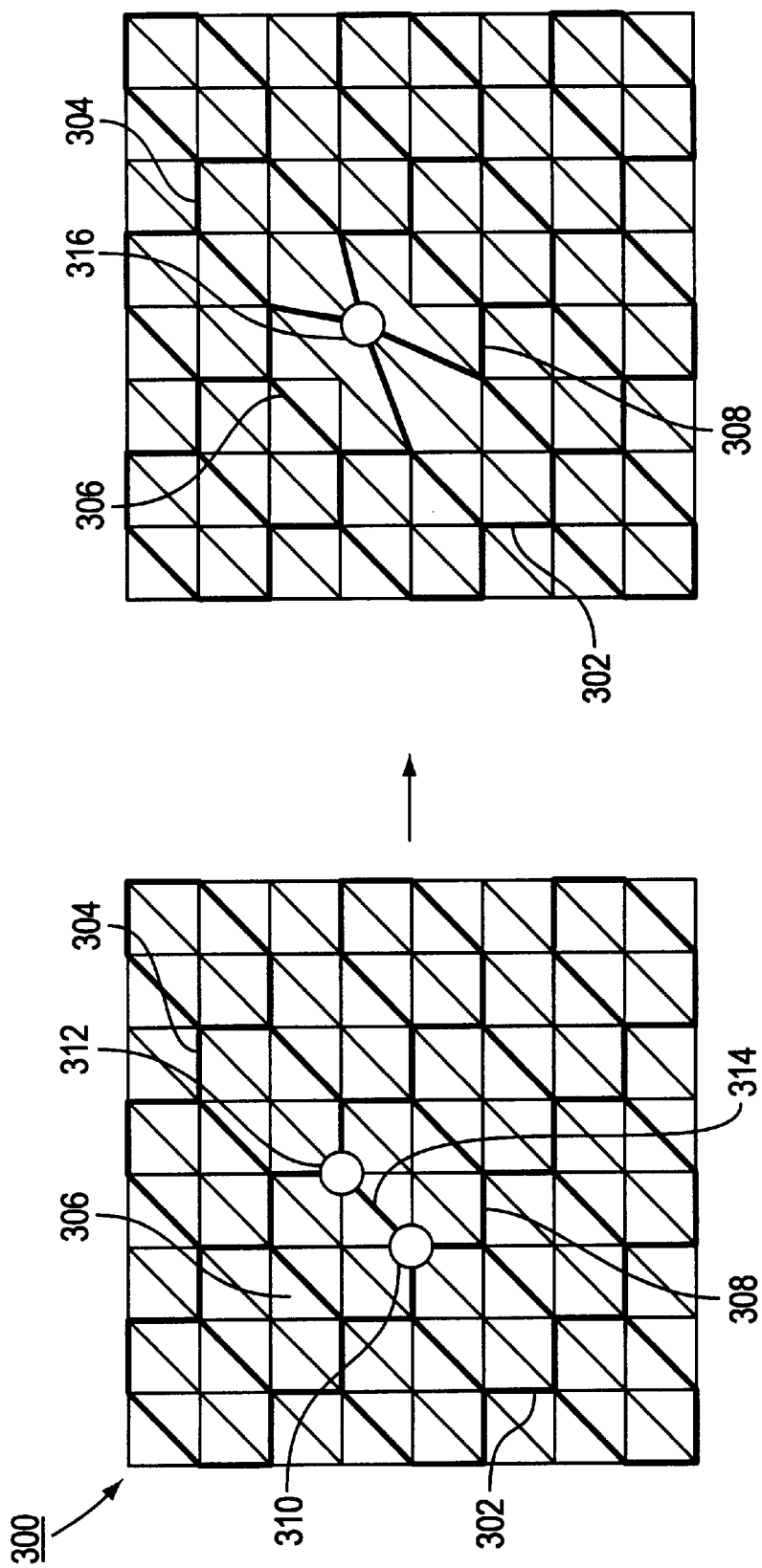
FIGS. 5(A) and 5(B) illustrate an example of a CBV-CBV collapse in a cycle-preserving PM decimation according to the invention.

FIGS. 5(A) and 5(B) illustrate an example of a CBV-CBV collapse in a cycle-preserving PM decimation according to the invention. In this example, mesh 300 includes cycles 302, 304, 306 and 308 having common CBVs 310 and 312. The CBV-CBV collapse operation involves collapsing edge 314 between CBV 310 and CBV 312 into a common vertex. As shown in FIG. 5(B), this collapse preserves the complete-cycle covering of mesh 300 as its only effect on the covering is to reduce the valence of cycles 306 and 308 associated with collapsed edge 314. The surviving vertex 316 remains a CBV.

Figures 6A, 6B:
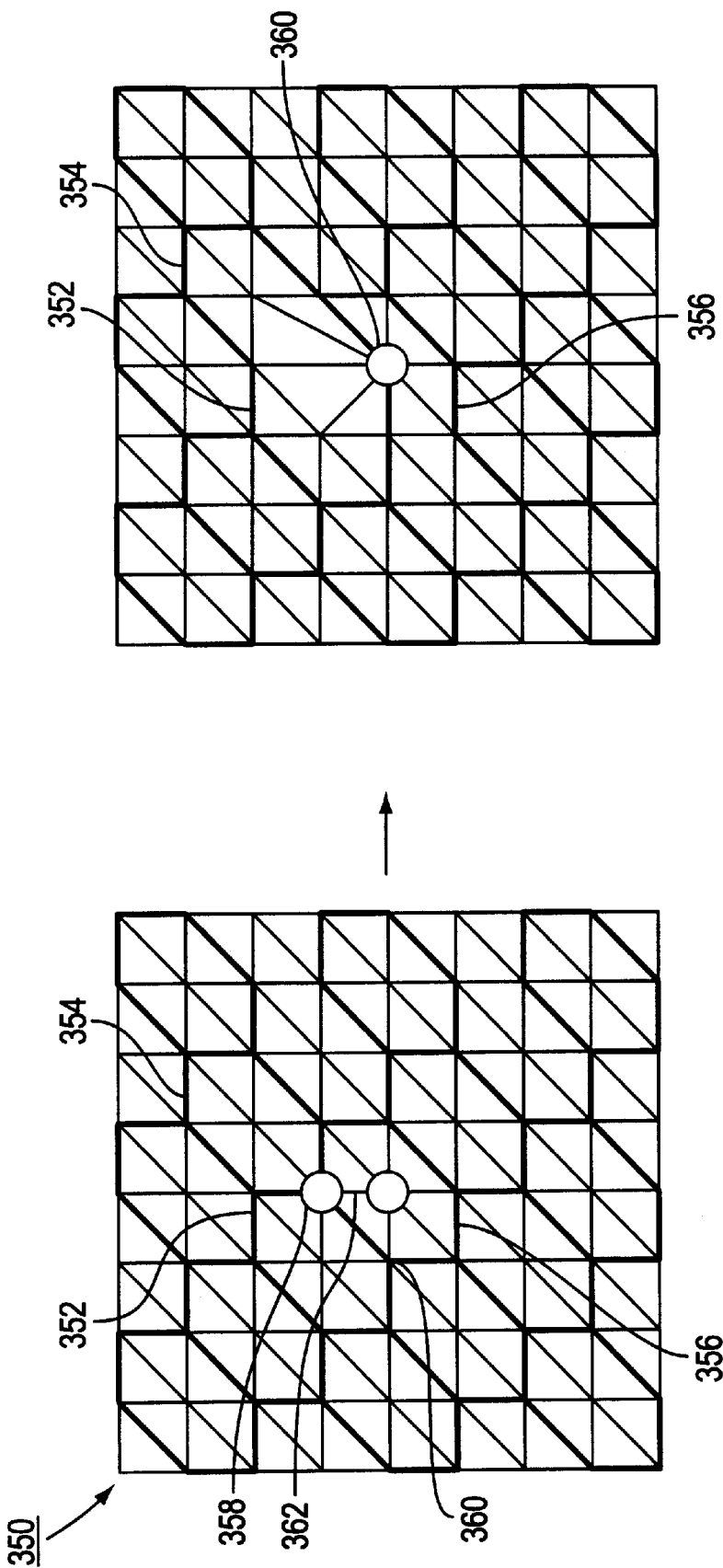

FIGS. 6(A) through 6(D) illustrate an example of a CBV-CV collapse in a cycle-preserving PM decimation according to the invention. In this example, mesh 350 includes cycles 352, 354, and 356. Cycles 352, 354 and 356 share CBV 358, and cycle 356 includes its CV 360. The CBV-CV collapse operation could involve collapsing edge 362 between CBV 358 and CV 360 so that CBV 358 is eliminated. However, as shown in FIG. 6(B), such an operation would violate the complete-cycle covering of mesh 300 because cycle 356's CV 360 would now be a CBV of cycles 352 and 354.

Accordingly, as shown in FIG. 6(C), the solution involves performing an aggregate collapse of all the CBVs 364 adjacent to CV 360 into CV 360. Following the aggregate collapse, as shown in FIG. 6(D) vertex 360 becomes a CBV of cycles 352, 354, 366, 368, 370, and 372.

Figures 7A, 7B:
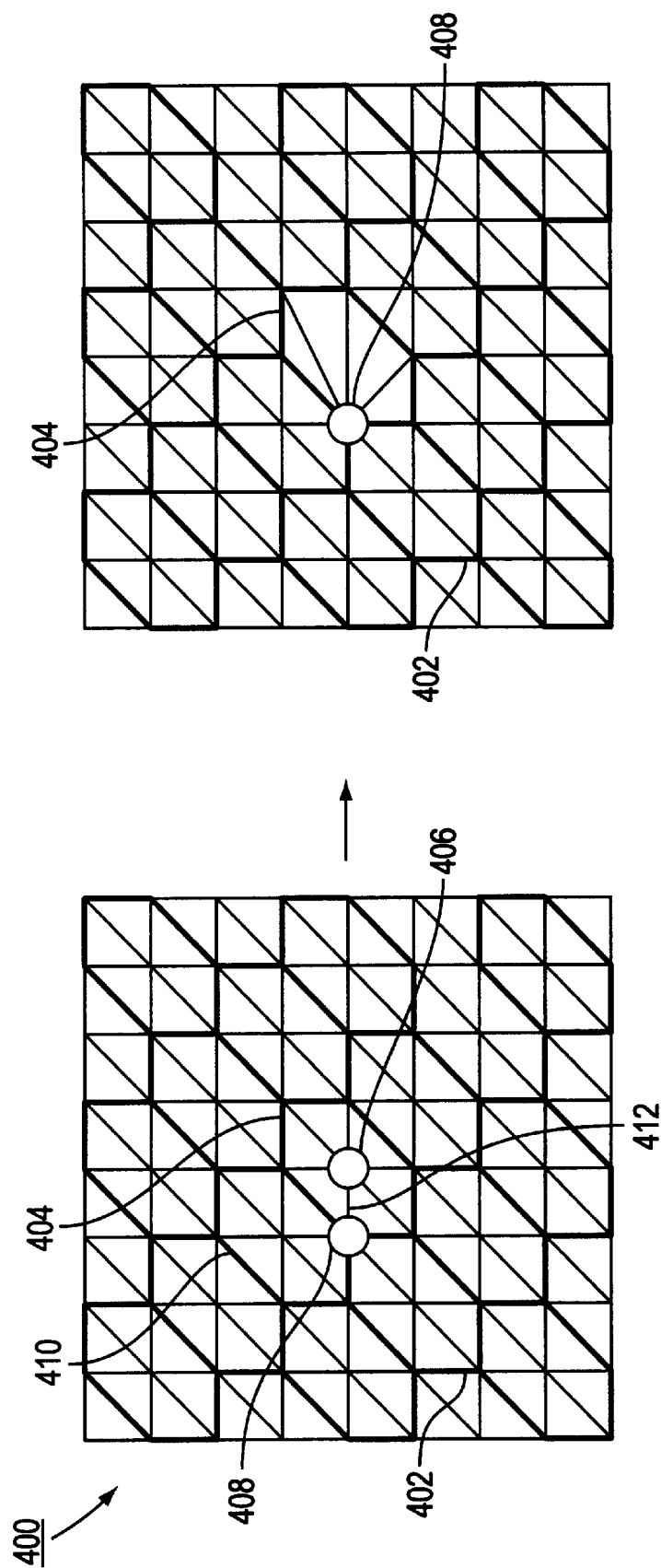
FIGS. 7(A) through 7(D) illustrate an example of a CV-CBV collapse in a cycle-preserving PM decimation according to the invention.

FIGS. 7(A) through 7(D) illustrate an example of a CV-CBV collapse in a cycle-preserving PM decimation according to the invention. In this example, mesh 400 includes cycles 402, 404, and 410. Cycles 402, 404 and 410 share CBV 408, and cycle 404 includes its CV 406. The CV-CBV collapse operation could involve collapsing edge 412 between CBV 408 and CV 406 so that CV 406 is eliminated. However, as shown in FIG. 7(B), such an operation would violate the complete cycle covering of mesh 300 because cycle 402's CBV 408 would now be a CV of cycle 404.

Figure 7D:
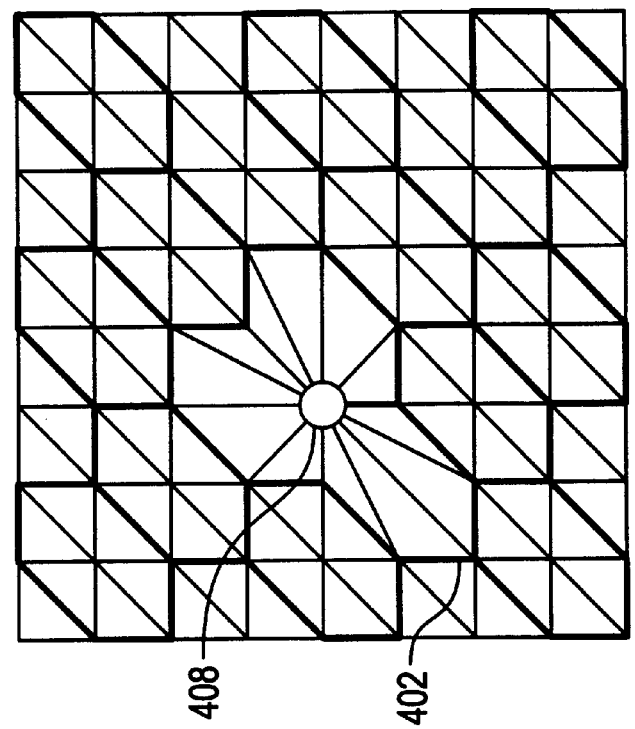
Figure 7C:
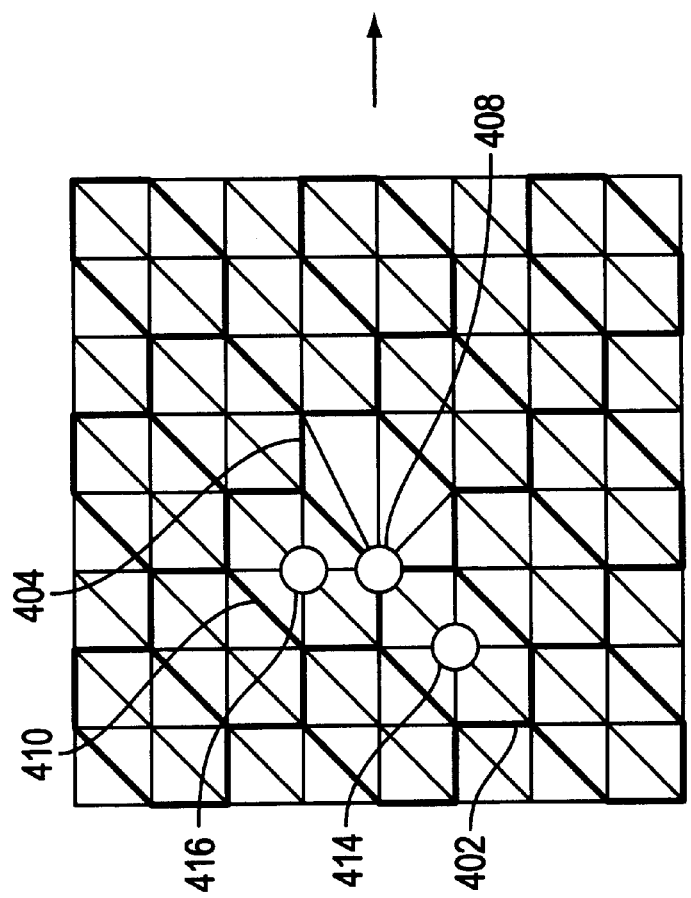

Accordingly, as shown in FIG. 7(C) and FIG. 7(D), the solution involves further performing an aggregate collapse of CVs 414 and 416 adjacent to CBV 408 into CBV 408. Following the aggregate collapse, as shown in FIG. 7(D), vertex 408 becomes the CV of cycle 402, and cycles 404 and 410 disappear.

It should be noted that geomorphs are possible with each of the above operations. That is, a continuous transformation between each CBV-CBV, CV-CBV, and CBV-CV collapse can be defined to smoothly transition between interim meshes. Moreover, an inverse split operation exists for each of the above collapse operations.

It should be further noted that a CV-CV collapse is possible. Because the first axiom requires that a CV cannot be adjacent to another CV, however, the cycle vertices in question must be connected by swapping the diagonal of the quadrilateral which forms the bridge between the cycle vertices. The CV-CV edge now formed can be collapsed. The decimation operation of this type is therefore a diagonal swap operation followed by a CV-CV edge collapse. The surviving vertex remains a CV. This is the only decimation operation that does not consist solely of one or more edge collapses. Therefore, since it contains a discontinuous edge swap operation, a PM that contains the decimation operations of this type cannot form geomorphs as the change in topology between interim meshes is not continuous. If the ability to create geomorphs on the PM is needed then the CV-CV decimation operation should not be used, and accordingly is not included in the preferred form of the invention.

Progressive Mesh Encoding

As in the conventional progressive mesh, the cycle-preserving PM is encoded as a base mesh and a sequence of mesh modification records. The mesh modification records can each be interpreted during run-time evaluation so as to perform either a refinement (i.e., split) or decimation (i.e., collapse) operation. The interpretation that is applied at run-time depends on whether the mesh level of detail is increasing or decreasing. To support the cycle-preserving operations described above, the conventional PM encoding can be modified to add information that supports the new operations. However, because a cycle-preserving PM is a constrained PM, the amount of information that can be consolidated is such that the total space required to store information to represent a cycle-preserving PM is actually less than that required for the conventional PM.

The conventional PM transformations consist of an edge collapse and a vertex split. An edge collapse unifies two adjacent vertices $v_s$ and $v_t$ into a single vertex $v_s$, and a vertex split, the inverse transformation, adds near vertex $v_s$ a new vertex $v_t$ and two new faces $\{v_s, v_t, v_1\}$ and $\{v_t, v_s, v_r\}$ (the vertex split operation may only add a single new face if $v_t$ is on a boundary). These transformations are captured in a unified parameterization $\{v_s, v_l, v_r, v_t, A\}$, where A is updated attribute information referenced to the two vertices $v_s$ and $v_t$. See the above-referenced paper by Hoppe for more details on these transformations.

The CBV-CBV collapse is the standard PM decimation transformation in the cycle-preserving PM. The inverse split of the CBV-CBV collapse is the standard refinement operation. The CV-CBV transformation can be encoded as a sequence of standard transformations, but the remaining one of the above-described transformations, the CBV-CV transformation can not be so readily encoded. Accordingly, it is not used in this example of the invention.

The two cycle-preserving PM transformations, CBV-CBV and CV-CBV, can be seen as sequences of conventional PM transformations. Accordingly, the cycle-preserving PM can be encoded by using the conventional PM transformations, with some additional information.

1. Each PM modification record contains a field which specifies the type of cycle-preserving PM operation to be performed (i.e., CBV-CBV or CV-CBV).
2. The CV-CBV operation requires additional information over the standard PM modification record to execute it. The number of edge-collapses and vertex-splits that must be performed as part of the operation must be specified.
3. Since the CV-CBV operation is an aggregate operation, all information (e.g., index, final position, updated normal) for the CV vertex which is common among all the aggregated operations need be stored only once.

The base mesh also requires modification so that the cycles in the base mesh are identified. Since the base mesh is usually quite small, this overhead is minimal.

Run-Time Data Structures

Figure 8:
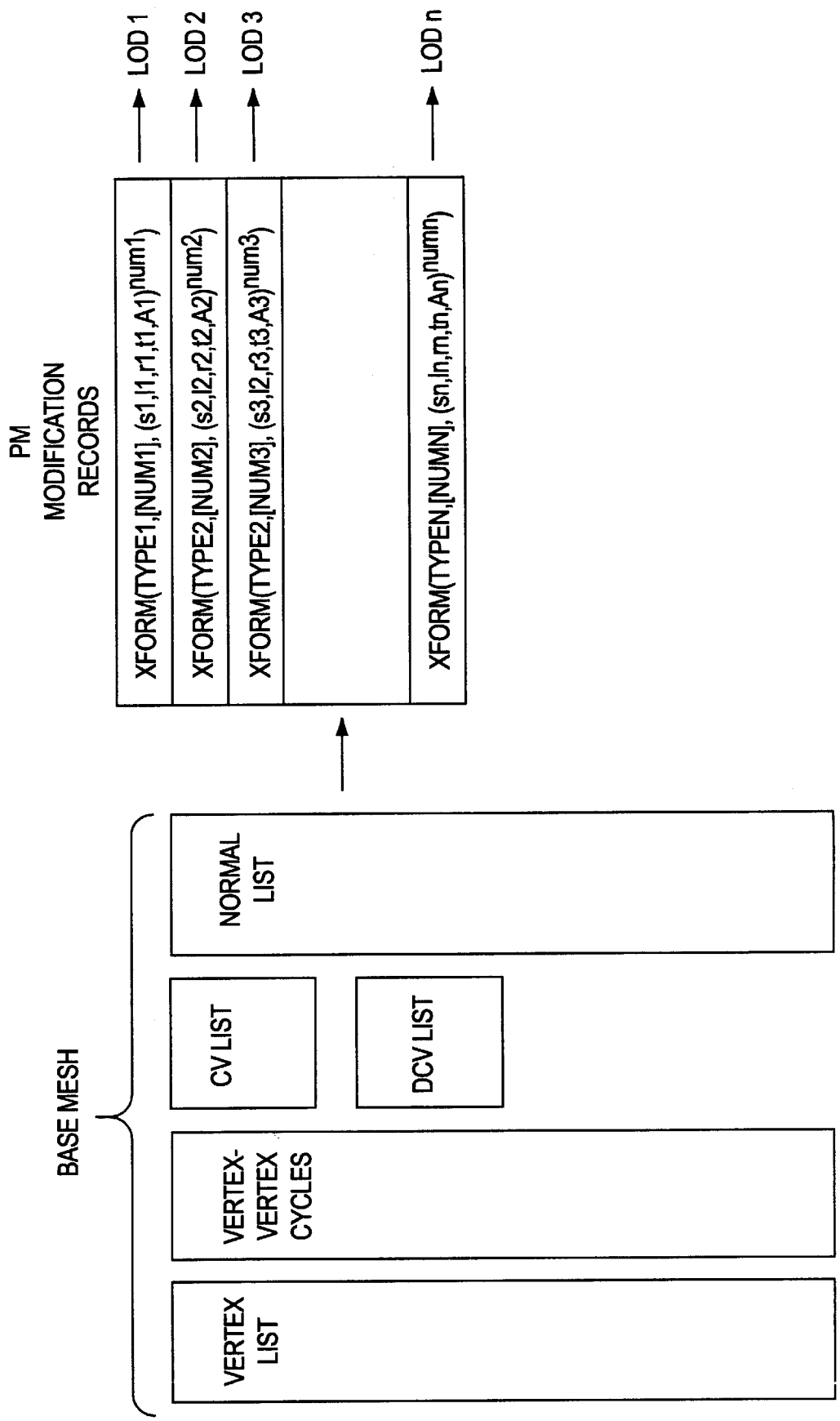
FIG. 8 illustrates the data structures resulting from a cycle-preserving PM encoding of a mesh according to the invention.

The data structures resulting from the cycle-preserving PM encoding are illustrated in FIG. 8. As can be seen, the base mesh consists of a vertex list, a vertex-vertex cycle list, a CV list, a DCV list, and a normals list. The PM modification records contain the information relating to transformations for providing levels of detail with corresponding interim meshes between the base mesh and the original mesh. It should be noted at this time that for lossless reproduction of the original mesh, the diagonal swap information is also stored in addition to the PM modification records. The contents of these lists will be described in more detail hereinbelow.

The vertex list contains the coordinates of the mesh vertices. The PM modification records reference this list for LOD construction and the renderer uses it for rendering via the CV list. The vertex list can be allocated to its maximum size up front or can grow and shrink with the level of detail of the mesh which utilizes it. Using a dynamic list minimizes memory usage but makes frame-rate management more difficult. The list is preferably ordered in PM modification record ordering—i.e., the PM records introduce vertices in a specific ordering and the vertex list should reflect this ordering as this reduces the amount of information that needs to be stored in a PM modification record. Accordingly, the added vertex in a vertex split operation described in a PM modification record can be implicitly referenced according to the sequential order of the operation in the PM modification record list, which corresponds to the order of vertices listed in the vertex and vertex-vertex cycle lists.

The vertex-vertex cycle list lists all the adjacent vertices about each vertex in the vertex list, whether they are CVs or CBVs. This list contains the topological adjacency information useable in an efficient manner by both the LOD and rendering systems. These lists can be two separate lists which grow and shrink dynamically or they can be sublists of a statically allocated single list. Separate, dynamic lists minimize memory but make frame-rate management more difficult. Each element contains a variable number of indices into the vertex list, corresponding to the adjacent vertices.

The CV list identifies the CVs in the vertex-vertex cycle list. Each element of the list contains an index into the vertex-vertex cycle list. The renderer accesses the cycles to render using the CV list.

The DCV list is used to identify and render discontinuity cycle vertices, as will be described in more detail below. Each element in the list contains an index into the vertex-vertex cycle list.

The normal list contains the normal information for each vertex in the vertex list. The normal information can be the actual normal at each vertex, or it can be an index into a global normal. A global normal can be, for example, such as that described in the VRML 2.0 specification. Using a global normal can save a vast amount of memory at the cost of some normal resolution.

The PM modification record list is the encoding of the PM as described above. It is stored in the LOD module data space. It contains indices that reference the vertex list. This encoding can be paged with up to record granularity.

LOD Construction

LOD construction is performed on a per-frame, per-mesh basis based on the importance of the mesh to the frame. The importance of each mesh can be arbitrary or can be based on several factors, the discussion of which is not necessary for an understanding of the present invention. The table below includes pseudocode that describes an example of the runtime processing of a single mesh modification operation. It may take multiple mesh modification operations to reach the desired frame LOD for a mesh.

will be the case a significant portion of the time because often, when a simple parametric surface is tesselated, the resulting mesh is regular and a complete-cycle covering can be constructed without modification to the mesh.

When, however, mesh modification is required during pre-processing, dynamic reconstruction will be necessary to obtain the highest (i.e. original) level of detail.

The modifications made during pre-processing to construct the complete-cycle covering are captured in the diagonal swap list. These diagonals must be re-swapped in inverse order to back out of the modifications to the original mesh.

A diagonal swap can be performed at run-time via the following steps.

1. Pop the diagonal off of the diagonal list. The diagonal is an edge defined by two vertices, vertex1 and vertex2.
2. Search about the vertex cycle of vertex1 until vertex2 is reached. Delete vertex2 from vertex1's vertex cycle. If vertex1 is not a cycle vertex, then push it onto the CV

TABLE 2

```
If (mesh LOD is increasing) then
        RefineMesh(mesh, PMRecord);
else
        DecimateMesh(mesh, PMRecord);
RefineMesh(mesh, PMRecord)
{
        /* Determine the refine operation type */
        type = typeof(PMRecord); /*one of [cbv-cbv], [cv-cbv]*/
        /* Execute the refine operation */
        if(type == [cbv-cbv]) {
                Perform the topological and geometric operations.
                Push the new vertex created on the end of the vertex list.
                Create a cycle for the new vertex and push it on the end of the
                    vertex-vertex cycle list.
        }
        else if(type = [cv-cbv]){
                Perform the topological and geometric operations.
                Push each new vertex created on the end of the vertex list.
                For each new vertex, create a cycle and push it on the end of the
                    vertex-vertex cycle list.
                        Push a pointer to each new cv created onto the end of the cv list.
        }
}
DecimateMesh(mesh, PMRecord)
{
        /* Inverse of RefineMesh() */
}
```

Rendering

Rendering is made simple and efficient by the present invention because rendering a cycle-preserving mesh simply involves iterating through the CV list and rendering each cycle directly using a triangle fan primitive. The following table includes pseudocode illustrating an example of the process used to render a mesh.

TABLE 3

```
RenderMesh(cvList, vertexList)
{
        For each cv in cvList:
                RenderTriangleFan(cv, vertexList)
}
```

Lossless Reconstruction

If the pre-processing to compute the complete cycle covering was lossless, then the pre-processing was a null operation so that further reconstruction is unnecessary. This list, thus effectively marking it as one, even though it is only a partial cycle.

3. Search about the vertex cycle of vertex2 until vertex1 is reached. Delete vertex1 from vertex2's vertex cycle. If vertex2 is not a cycle vertex, then push it onto the CV list, thus effectively marking it as one, even though it is only a partial cycle.

The table below compares the memory requirements for representing a mesh according to two conventional techniques (independent triangles and vertex pools), and the triangle cycles of the present invention. Not all data structures are included. The vertex list storage is common to each of the data representations used below and so is not included. The PM encoding differs but that is discussed above. Discontinuity representation also significantly affects memory requirements and is discussed in more detail below. The table below illustrates that the technique of the present invention not only overloads the adjacency information for dual-use, but also reduces mesh data structure size by almost 30%.

TABLE 4

| | Bytes/Element | Independent Triangles | Vertex Pools | Triangle Cycles |
|---|---|---|---|---|
| Triangle List | 12* | Yes | Yes | No |
| Vertex-Triangle Cycle List*, ** | Avg.#$_{tri/cycle}$*4 | Yes | Yes | No |
| Vertex-Vertex Cycle List*, ** | Avg.#$_{vert/cycle}$*4 | No | No | Yes |
| CV List*, *** | 4 | No | No | Yes |
| Total Per-Vertex Memory Requirements | N/A | 36 | 36 | 25.33 |

*If the maximum mesh size (measured in number of triangles) is limited to 64K then only 6 bytes is required, and the multiplication factor for these lists only needs to be 2 bytes. In this case, a vertex-triangle representation of the adjacency information is more constraining than a vertex-vertex representation as the former references into the triangle list which is usually larger than the vertex list.
**Using Avg.#$_{tri/cycle}$ = 6, Avg.#$_{vert/cycle}$ = 6.
***Typically, only one-third of the vertices will be cycle vertices. Accordingly, the number of bytes per element can be amortized over all vertices as 1.33 bytes per element.

Discontinuities

A discontinuity is a crease, corner or other manifestation of non-smoothness on the surface of the mesh. More formally, a discontinuity exists at the boundary of two surface primitives when the inner product of the tangent vectors is not zero—i.e., the derivatives are not collinear. Discontinuity representation is an essential component of realistic rendering.

According to an aspect of the present invention, the optimized triangle-cycle covering representation outlined above allows discontinuities to be rendered. There is some cost to rendering performance but typically the number of discontinuities in a mesh is small and therefore the cost is minimal. The degree to which discontinuities are represented can be set in the offline processing stage and discontinuity processing can be turned off dynamically.

Discontinuities manifest in the mesh by tagging each cycle vertex that has one or more incident discontinuity edges as a discontinuity cycle vertex. Only cycle vertices are tagged because cycles are the finest level of granularity with which the mesh is rendered. Both the base mesh and PM records must be modified to identify discontinuity vertices. The base mesh can do this by adding a flag that specifies whether each cycle vertex is a discontinuity vertex or not. The CBV-CBV PM record need not be changed as this does not introduce a cycle vertex. The CV-CBV record's attribute parameterization must be augmented to specify whether the new cycle vertex being introduced is discontinuous or not. For simplicity in run-time processing, a cycle vertex's discontinuity state remains fixed throughout its lifetime. This constraint could be lifted at the expense of processing simplicity and cost.

For efficient run-time processing, discontinuity cycle vertices (DCVs) must be separated from the remaining CVs and placed in a separate list—this is the DCV List. This list is used by the renderer to render the DCV cycles as independent triangles. Each entry in the DCV List consists of an index into the vertex-vertex cycle to identify the cycle as well as a pointer to a list containing the per-vertex, per-face (i.e., per-corner), normals for the discontinuity cycle. The renderer will use these normals when rendering the faces in the cycle. Whenever this DCV's cycle is affected by a PM modification record, the same operation must be applied to its normal cycle.

Storing and rendering discontinuities in this manner can achieve an optimized balance of rendering time, data structure space requirements and discontinuity representation. Rendering using independent triangles is not optimized but the number of discontinuity vertices in a mesh is usually small so the total rendering time is still quite optimal. This method is space efficient because a global normal can be used. Discontinuity representation is not compromised at all because per-corner normal binding is used to render the discontinuities. In comparison, rendering an entire mesh using independent triangles allows unconstrained discontinuity representation but the rendering is not optimized and vertex-pool rendering, while optimized, is not at all amenable to unconstrained discontinuity representation in the context of continuous LODs.

Thus, there has been shown and described hereinabove a novel method and apparatus for providing continuous LODs which fulfill all of the objects and advantages sought therefor. Many changes, alterations, modifications and other uses and applications of the subject method and apparatus will become apparent to those skilled in the art after considering the specification together with the accompanying drawings. All such changes, alterations and modifications which do not depart from the spirit and proper legal scope of the invention are deemed to be covered by the invention, as defined by the claims which follow.

I claim:

1. A method for providing continuous level of detail including:

processing a mesh to generate a base mesh and a plurality of progressive mesh modification records, said progressive mesh modification records corresponding to interim meshes having corresponding levels of detail, said base mesh and said interim meshes comprising a plurality of vertices, adjacent ones of said vertices sharing edges; and constraining said processing step so that said vertices of said base mesh and said interim meshes all belong to complete cycles, each of said vertices being identified as one of a cycle vertex and a cycle boundary vertex, said complete cycles each comprising one said cycle vertex and a plurality of said cycle boundary vertices adjacent to said cycle vertex.

2. The method defined in claim 1, wherein said constraining step includes swapping diagonals in said mesh to insure that said base and interim meshes are comprised of only complete cycles.

3. The method of claim 1, wherein said constraining step includes:

tagging each vertex in said mesh as one of said cycle vertex and said cycle boundary vertex;

firstly verifying that all vertices adjacent to each vertex tagged as said cycle vertex are tagged as cycle boundary vertices; and secondly verifying that a cycle formed by all vertices adjacent to each vertex tagged as said cycle boundary vertex is comprised of an alternating sequence of vertices tagged as cycle vertices and cycle boundary vertices.

4. The method defined in claim 3, further comprising:

identifying a failed vertex that fails said first and second verifying steps;

identifying a polygon having said failed vertex as one of its vertices;

identifying a first diagonal of said polygon by which two vertices of said polygon are currently adjacent;

identifying a second diagonal of said polygon by which two other vertices of said polygon that are not currently adjacent can be made to be adjacent;

swapping said first diagonal with said second diagonal so that said two other vertices are adjacent; and repeating said first and second verifying steps for all vertices of said polygon.

5. The method defined in claim 4, further comprising storing information relating to said swapping step.

6. The method defined in claim 5, further comprising:

selecting certain of said progressive mesh modification records in accordance with a desired level of detail;

building said desired level of detail by modifying a current mesh having a corresponding current level of detail in accordance with said certain progressive mesh modification records and said base mesh to arrive at an interim mesh corresponding to said desired level of detail; and adjusting said interim mesh in accordance with said stored information relating to said swapping step.

7. The method defined in claim 1, further comprising:

selecting certain of said progressive mesh modification records in accordance with a desired level of detail; and building said desired level of detail by modifying a current mesh having a corresponding current level of detail in accordance with said certain progressive mesh modification records and said base mesh to arrive at an interim mesh corresponding to said desired level of detail.

8. The method defined in claim 7, wherein said progressive mesh modification records define refinement operations and decimation operations, said building step including:

refining said current mesh in accordance with said refinement operations of said certain progressive mesh modification records to arrive at said corresponding interim mesh.

9. The method defined in claim 7, wherein said progressive mesh modification records define refinement operations and decimation operations, said building step including:

decimating said current mesh in accordance with said decimation operations of said certain progressive mesh modification records to arrive at said corresponding interim mesh.

10. The method defined in claim 9, wherein said decimating step includes collapsing a first cycle boundary vertex of said current mesh into a second cycle boundary vertex of said current mesh adjacent to said first cycle boundary vertex.

11. The method defined in claim 9, wherein said decimating step includes collapsing all cycle vertices of said current mesh that are adjacent to a first cycle boundary vertex of said current mesh into said first boundary cycle vertex.

12. The method defined in claim 1, wherein said processing step includes:

performing a decimation operation on said mesh to form a decimated mesh with a corresponding lower level of detail, said decimated mesh having a second complete cycle covering different than a first complete cycle covering of said mesh; and generating a progressive mesh modification record including information about said decimation operation.

13. The method defined in claim 12, wherein said decimation operation includes collapsing a first cycle boundary vertex of said mesh into a second cycle boundary vertex of said mesh adjacent to said first cycle boundary vertex.

14. The method defined in claim 12, wherein said decimation operation includes collapsing all cycle vertices of said mesh that are adjacent to a first cycle boundary vertex of current mesh into said first boundary cycle vertex.

15. The method defined in claim 1, wherein said processing step includes:

generating a vertex list corresponding to said mesh;

remapping said vertex list in correspondence with an ordering of said progressive mesh modification records.

16. A method for processing a mesh having a plurality of vertices, adjacent ones of said vertices sharing edges, said method comprising:

calculating a complete cycle covering of said mesh such that all said vertices belong to cycles; and tagging each of said vertices as one of a cycle vertex and a cycle boundary vertex, each of said cycles consisting of one cycle vertex and a plurality of cycle boundary vertices.

17. The method defined in claim 16, wherein said calculating step is performed such that all vertices adjacent to each vertex tagged as said cycle vertex are tagged as cycle boundary vertices and such that a non-covering cycle formed by all vertices adjacent to each vertex tagged as said cycle boundary vertex is comprised of an alternating sequence of vertices tagged as cycle vertices and cycle boundary vertices.

18. The method defined in claim 16, further comprising:

generating a plurality of progressive mesh modification records, said progressive mesh modification records corresponding to interim meshes having corresponding levels of detail between a base mesh and a detailed mesh, said generating step being performed such that all vertices in said base mesh, said interim meshes and said detailed mesh belong to cycles.

19. An apparatus for providing continuous level of detail including:

means for processing a mesh to generate a base mesh and a plurality of progressive mesh modification records, said progressive mesh modification records corresponding to interim meshes having corresponding levels of detail, said base mesh and said interim meshes comprising a plurality of vertices, adjacent ones of said vertices sharing edges; and means for constraining said processing step so that all said vertices in said base mesh and said interim meshes belong to cycle coverings, each of said vertices being identified as one of a cycle vertex and a cycle boundary vertex, said cycle coverings each comprising one said cycle vertex and a plurality of said cycle boundary vertices adjacent to said cycle vertex.

20. The apparatus defined in claim 19, wherein said means for constraining includes means for swapping diagonals in said mesh to insure that all vertices in said mesh belong to cycle coverings.

21. The apparatus of claim 19, wherein said means for constraining includes:

means for tagging each vertex in said mesh as one of said cycle vertex and said cycle boundary vertex;

first means for verifying that all vertices adjacent to each vertex tagged as said cycle vertex are tagged as cycle boundary vertices; and second means for verifying that a cycle formed by all vertices adjacent to each vertex tagged as said cycle boundary vertex is comprised of an alternating sequence of vertices tagged as cycle vertices and cycle boundary vertices.

22. The apparatus defined in claim 21, further comprising:

means for identifying a failed vertex that fails to be verified by said first and second verifying means;

means for identifying a polygon having said failed vertex as one of its vertices;

means for identifying a first diagonal of said polygon by which two vertices of said polygon are currently adjacent;

means for identifying a second diagonal of said polygon by which two other vertices of said polygon that are not currently adjacent can be made to be adjacent;

means for swapping said first diagonal with said second diagonal so that said two other vertices are adjacent.

23. The apparatus defined in claim 22, further comprising means for storing information relating to said first and second diagonals swapped by said swapping means.

24. The apparatus defined in claim 23, further comprising:

means for selecting certain of said progressive mesh modification records in accordance with a desired level of detail;

means for building said desired level of detail by modifying a current mesh having a corresponding current level of detail in accordance with said certain progressive mesh modification records and said base mesh to arrive at an interim mesh corresponding to said desired level of detail; and means for adjusting said interim mesh in accordance with said stored information relating to said swapping step.

25. The apparatus defined in claim 19, further comprising:

means for selecting certain of said progressive mesh modification records in accordance with a desired level of detail; and means for building said desired level of detail by modifying a current mesh having a corresponding current level of detail in accordance with said certain progressive mesh modification records and said base mesh to arrive at an interim mesh corresponding to said desired level of detail.

26. The apparatus defined in claim 25, wherein said progressive mesh modification records define refinement operations and decimation operations, said means for building including:

means for refining said current mesh in accordance with said refinement operations of said certain progressive mesh modification records to arrive at said corresponding interim mesh.

27. The apparatus defined in claim 25, wherein said progressive mesh modification records define refinement operations and decimation operations, said means for building including:

means for decimating said current mesh in accordance with said decimation operations of said certain progressive mesh modification records to arrive at said corresponding interim mesh.

28. The apparatus defined in claim 27, wherein said means for decimating includes means for collapsing a first cycle boundary vertex of said current mesh into a second cycle boundary vertex of said current mesh adjacent to said first cycle boundary vertex.

29. The apparatus defined in claim 27, wherein said means for decimating includes means for collapsing all cycle vertices of said current mesh that are adjacent to a first cycle boundary vertex of said current mesh into said first boundary cycle vertex.

30. The apparatus defined in claim 19, wherein said means for processing includes:

means for performing a decimation operation on said mesh to form a decimated mesh with a corresponding lower level of detail, said decimated mesh having a second complete cycle covering different than a first complete cycle covering of said mesh; and means for generating a progressive mesh modification record including information about said decimation operation.

31. The apparatus defined in claim 30, wherein said decimation operation includes collapsing a first cycle boundary vertex of said mesh into a second cycle boundary vertex of said mesh adjacent to said first cycle boundary vertex.

32. The apparatus defined in claim 30, wherein said decimation operation includes collapsing all cycle vertices of said mesh that are adjacent to a first cycle boundary vertex of current mesh into said first boundary cycle vertex.

33. The apparatus defined in claim 19, wherein said means for processing includes:

means for generating a vertex list corresponding to said mesh;

means for remapping said vertex list in correspondence with an ordering of said progressive mesh modification records.

34. An apparatus for processing a mesh having a plurality of vertices, adjacent ones of said vertices sharing edges, said apparatus comprising:

a pre-processor that calculates a complete cycle covering of said mesh such that all said vertices belong to cycles, said pre-processor tagging each of said vertices as one of a cycle vertex and a cycle boundary vertex, each of said cycles consisting of one cycle vertex and a plurality of cycle boundary vertices.

35. The apparatus defined in claim 34, wherein said pre-processor calculates said complete cycle covering such that all vertices adjacent to each vertex tagged as said cycle vertex are tagged as cycle boundary vertices and such that a non-covering cycle formed by all vertices adjacent to each vertex tagged as said cycle boundary vertex is comprised of an alternating sequence of vertices tagged as cycle vertices and cycle boundary vertices.

36. The apparatus defined in claim 34, further comprising:

an encoder that generates a plurality of progressive mesh modification records, said progressive mesh modification records corresponding to interim meshes having corresponding levels of detail between a base mesh and a detailed mesh, said encoder being operative such that all vertices in said base mesh, said interim meshes and said detailed mesh belong to cycles.

37. A method comprising:

an offline generation process for generating a base mesh and a plurality of progressive mesh modification records, said base mesh comprised of topological adjacency information, said progressive mesh modification records respectively corresponding to a plurality of interim meshes each having a respective level of detail greater than that of said base mesh, said base mesh and said interim meshes comprising a plurality of vertices, adjacent ones of said vertices sharing edges, all of said vertices of said base mesh and said interim meshes belonging to complete cycles, each of said vertices being identified as one of a cycle vertex and a cycle boundary vertex, said complete cycles each comprising one said cycle vertex and a plurality of said cycle boundary vertices adjacent to said cycle vertex; and a run-time evaluation process for rendering one of said base mesh and said plurality of interim meshes having a desired level of detail utilizing said topological adjacency information and certain of said progressive mesh modification records.

* * * * *